US012333884B2

(12) United States Patent
Voloh et al.

(10) Patent No.: US 12,333,884 B2
(45) Date of Patent: *Jun. 17, 2025

(54) ENCLOSURE ASSEMBLY FOR HOUSING A BANK NOTES ACCEPTOR WITHIN AN ELECTRONIC GAMING MACHINE

(71) Applicant: Aristocrat Technologies Australia Pty Limited, North Ryde (AU)

(72) Inventors: Noel Voloh, Sydney (AU); Conrado Villegas, Jr., Salisbury (AU); Vladimir Halic, Wollongong (AU); Nicholas Abraham, North Ryde (AU)

(73) Assignee: Aristocrat Technologies Australia Pty Limited, North Ryde (AU)

( * ) Notice: Subject to any disclaimer, the term of this patent is extended or adjusted under 35 U.S.C. 154(b) by 0 days.

This patent is subject to a terminal disclaimer.

(21) Appl. No.: 18/581,950

(22) Filed: Feb. 20, 2024

(65) Prior Publication Data

US 2024/0194015 A1 Jun. 13, 2024

Related U.S. Application Data

(63) Continuation of application No. 17/831,246, filed on Jun. 2, 2022, now Pat. No. 11,941,934.

(Continued)

(51) Int. Cl.

*G07D 11/125* (2019.01)
*G07D 11/40* (2019.01)

(52) U.S. Cl.

CPC ........... *G07D 11/125* (2019.01); *G07D 11/40* (2019.01); *G07D 2211/00* (2013.01)

(58) Field of Classification Search

CPC ...... G07D 11/125; G07D 11/40; G07D 13/00; G07D 2211/00; G07F 7/04; G07F 17/3216; G07F 17/3246

See application file for complete search history.

(56) References Cited

U.S. PATENT DOCUMENTS 4,597,340 A * 7/1986 Huckle ..................... G07F 9/06 902/13
4,638,746 A * 1/1987 Ishigure ............... G07D 11/125 109/66

(Continued)

OTHER PUBLICATIONS

Office Action (Notice of Allowance and Fees Due (PTOL-85)) dated Dec. 6, 2023 for U.S. Appl. No. 17/831,246 (pp. 1-8).

*Primary Examiner* — William L Miller

(74) *Attorney, Agent, or Firm* — Armstrong Teasdale LLP

(57) ABSTRACT

An enclosure assembly for securely housing a bank notes acceptor (BNA) for use with an electronic gaming machine (EGM) is provided. The enclosure assembly includes a housing defining an interior for receiving the BNA. The housing includes an engagement bracket extending between a first end coupled to a side wall and a second, free end. The door assembly includes a door panel and a lock assembly. The lock assembly includes a lock frame including a side wall and a projection provided thereon, the projection extends from the side wall and towards the engagement bracket. The lock assembly further includes a prong latch coupled to the lock frame that is engageable with the engagement bracket to lock the door assembly. The engagement bracket is resiliently flexible and is configured to move into contact with the projection to enhance a structural integrity of the enclosure assembly.

20 Claims, 18 Drawing Sheets

Related U.S. Application Data

(60) Provisional application No. 63/197,838, filed on Jun. 7, 2021.

(56) References Cited

U.S. PATENT DOCUMENTS

| | | | | |
|---|---|---|---|---|
| 5,209,395 | A | 5/1993 | Zouzoulas | |
| 5,515,959 | A | 5/1996 | Stephenson, III | |
| 5,676,231 | A | 10/1997 | Legras | |
| 5,700,195 | A | 12/1997 | Halic | |
| 5,740,897 | A | 4/1998 | Gauselmann | |
| 5,836,510 | A | 11/1998 | Kirchner | |
| 5,993,317 | A | 11/1999 | Majima | |
| 5,996,888 | A | 12/1999 | Gromatzky | |
| 6,019,207 | A | 2/2000 | Cole | |
| 6,135,261 | A | 10/2000 | Noell, Jr. | |
| 6,749,515 | B2 | 6/2004 | Hedrick | |
| 6,824,134 | B2 * | 11/2004 | Abe | G07D 11/12<br>109/47 |
| 6,976,919 | B2 | 12/2005 | Cole | |
| 7,601,067 | B2 | 10/2009 | Anderson | |
| 7,955,177 | B2 | 6/2011 | Hedrick | |
| 8,220,611 | B2 | 7/2012 | Cost | |
| 8,356,703 | B2 | 1/2013 | Vysma | |
| 8,641,535 | B2 | 2/2014 | Mccomb | |
| 9,721,414 | B2 | 8/2017 | Ledoux | |
| 10,643,422 | B2 | 5/2020 | Patel | |
| 12,214,285 | B2 * | 2/2025 | McClintock | A63F 13/90 |
| 2004/0207682 | A1 * | 10/2004 | Haney | G07F 19/20<br>347/20 |
| 2009/0176582 | A1 | 7/2009 | Cole | |
| 2016/0035170 | A1 | 2/2016 | Onipchenko | |
| 2023/0045373 | A1 | 2/2023 | Rodd | |
| 2023/0377410 | A1 | 11/2023 | Voloh | |
| 2024/0312296 | A1 * | 9/2024 | McKay | G07F 17/3216 |
| 2025/0037535 | A1 * | 1/2025 | Chen | G07F 17/3204 |

* cited by examiner

ENCLOSURE ASSEMBLY FOR HOUSING A BANK NOTES ACCEPTOR WITHIN AN ELECTRONIC GAMING MACHINE

CROSS-REFERENCE TO RELATED APPLICATIONS

This application is a continuation of U.S. patent application Ser. No. 17/831,246, filed Jun. 2, 2022, which claims priority to U.S. Provisional Application No. 63/197,838, filed Jun. 7, 2021, the contents and disclosure of which are hereby incorporated by reference in their entirety.

TECHNICAL FIELD

The field of relates generally to an enclosure assembly that houses a bank notes acceptor and, more specifically, an enclosure assembly having a torque damping door assembly, in which the door assembly engages with the housing to enhance a structural integrity of the enclosure assembly for added security within an electronic gaming machine.

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In some cases, a player may qualify for a special mode of the base game, a secondary game, or a bonus round of the base game by attaining a certain winning combination or triggering event in, or related to, the base game, or after the player is randomly awarded the special mode, secondary game, or bonus round. In the special mode, secondary game, or bonus round, the player is given an opportunity to win extra game credits, game tokens or other forms of payout. In the case of "game credits" that are awarded during play, the game credits are typically added to a credit meter total on the EGM and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player over the course of many plays or instances of the game, which is generally referred to as return to player (RTP). The RTP and randomness of the RNG ensure the fairness of the games and are highly regulated. Upon initiation of play, the RNG randomly determines a game outcome and symbols are then selected which correspond to that outcome. Notably, some games may include an element of skill on the part of the player and are therefore not entirely random.

BRIEF DESCRIPTION

In one aspect, an enclosure assembly for securely housing a bank notes acceptor (BNA) for use with an EGM is provided. The enclosure assembly includes a housing having a side wall at least partially defining an interior sized and shaped to receive the BNA. The housing further includes an engagement bracket extending between a first end coupled to the side wall and a second, free end. The enclosure assembly further includes a door assembly hingeably coupled to the housing and moveable between an open position and a closed position. The door assembly includes a door panel and a lock assembly coupled to the door panel for selectively locking the door panel on the housing. The lock assembly includes a lock frame including a side wall and a projection provided on the side wall, the projection extending outward from the side wall and towards the engagement bracket when the door assembly is in the closed position. The lock assembly further includes a prong latch moveably coupled to the lock frame. The prong latch is selectively engageable with the engagement bracket to lock the door assembly in the closed position. The engagement bracket is resiliently flexible and, in response to an opening force being applied on the door panel when the door assembly is locked in the closed position, the engagement bracket is configured to move into contact with the projection to enhance a structural integrity of the enclosure assembly.

In another aspect, an EGM is provided. The EGM includes a cabinet, a display coupled to the cabinet for display an electronic game thereon, and an enclosure assembly for securely housing a bank notes acceptor (BNA) therein. The enclosure assembly includes a housing including a side wall at least partially defining an interior sized and shaped to receive the BNA. The housing further includes an engagement bracket extending between a first end coupled to the side wall and a second, free end. The enclosure assembly further includes a door panel hingeably coupled to the housing and moveable between an open position and a closed position and a lock frame coupled to the door panel. The lock frame includes a side wall and a projection provided on the side wall, the projection extending outward from the side wall and towards the engagement bracket when the door panel is in the closed position. The enclosure assembly also includes a prong latch moveably coupled to the lock frame for selectively locking the door panel on the housing, the prong latch being selectively engageable with the engagement bracket to lock the door panel in the closed position. When the door panel is locked in the closed position, the engagement bracket is resiliently flexible to move into contact with the projection in response to an opening force being applied on the door panel to enhance a structural integrity of the enclosure assembly.

In yet another aspect, a method of securing a bank notes acceptor (BNA) within an enclosure assembly of an EGM is provided. The method includes providing a housing including a side wall at least partially defining an interior sized and shaped to receive the BNA, the housing further including an engagement bracket extending between a first end coupled to the side wall and a second, free end. The method further includes moving a door assembly from an open position to a closed position, the door assembly being hingedly coupled to the housing and including a door panel and a lock frame coupled to the door panel, the lock frame including a side wall and a projection provided on the side wall and extending outward therefrom towards the engagement bracket when the door assembly is in the closed position. The method further includes moving a prong latch into engagement with the engagement bracket to lock the door assembly in the closed position, the prong latch being moveably coupled to the lock frame. The engagement bracket is resiliently flexible and, in response to an opening force being applied on the door panel when the door assembly is locked in the closed position, the engagement bracket is configured to move into contact with the projection to enhance a structural integrity of the enclosure assembly.

BRIEF DESCRIPTION OF THE DRAWINGS

An example embodiment of the subject matter disclosed will now be described with reference to the accompanying drawings.

FIG. 4A is a perspective view of a portion of an EGM that includes an enclosure assembly for securely housing a currency acceptor, such as a bank notes acceptor (BNA), a bill validator, and the like.

DETAILED DESCRIPTION

An enclosure assembly for securely housing a bank notes acceptor (BNA) includes a housing defining an opening sized and shaped to receive the BNA. The housing includes an exterior portion and an interior portion. The housing includes an engagement bracket having a free end. A door is hingedly coupled to the housing and is moveable between an open position and a closed position and includes a lock assembly thereon. The lock assembly includes a lock frame having a projection and a prong latch moveably coupled to the lock frame. When the door is closed, the lock assembly may lock the door by moving the prong latch into engagement with the engagement bracket. The engagement bracket is resiliently flexible and may move or bend, in response to an opening force being applied on the door assembly is locked in the closed position, to contact the projection and restrain against opening of the door. The engagement bracket and lock assembly provide a compact mechanism for securely locking the door. For example, because the engagement bracket is resiliently flexible, the BNA may be easily removed from the housing without being obstructed by the engagement bracket.

Figure 1:
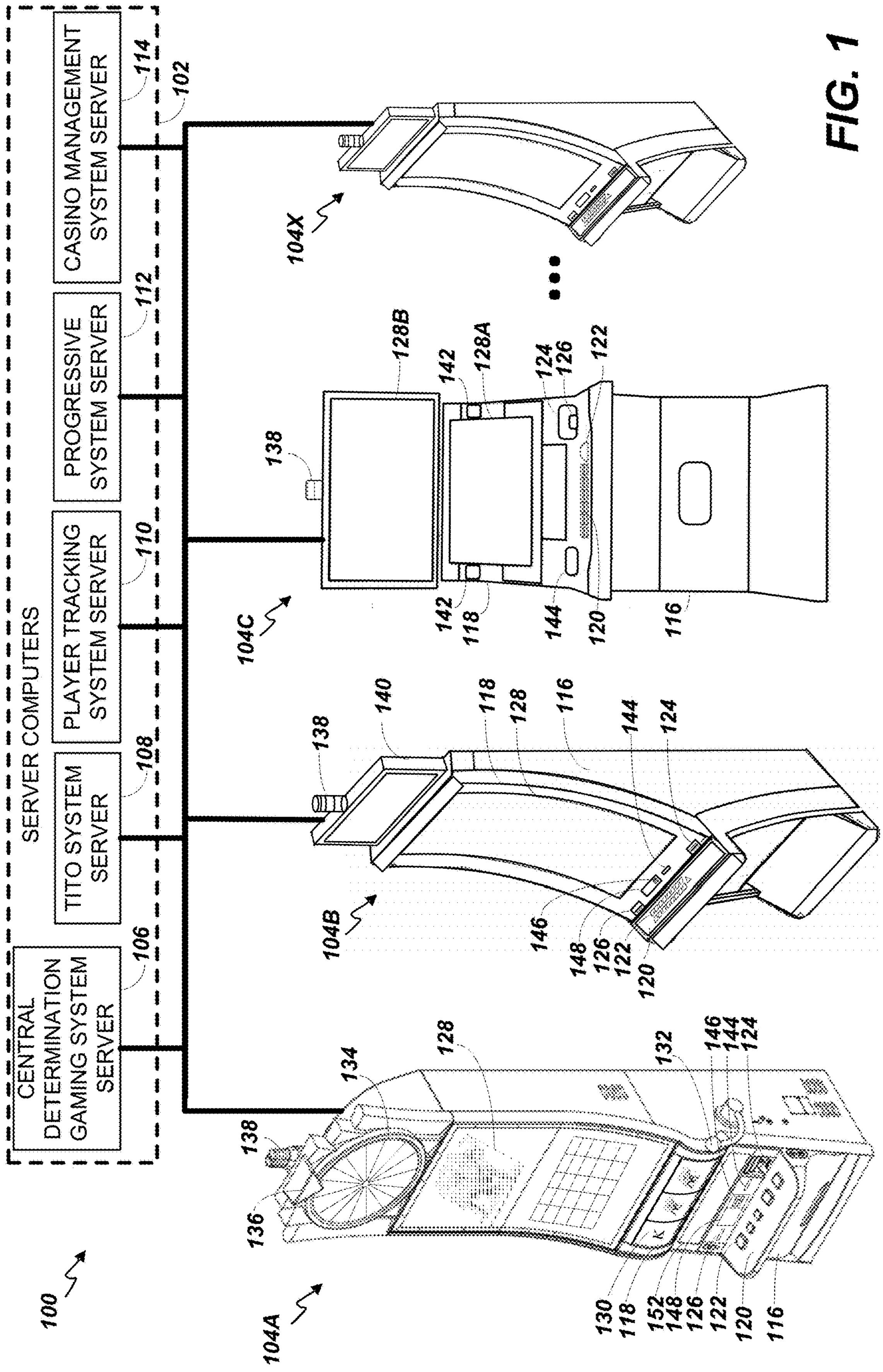
FIG. 1 is an exemplary diagram showing several EGMs networked with various gaming related servers.

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console. Gaming devices 104A-104X utilize specialized software and/or hardware to form non-generic, particular machines or apparatuses that comply with regulatory requirements regarding devices used for wagering or games of chance that provide monetary awards.

Communication between the gaming devices 104A-104X and the server computers 102, and among the gaming devices 104A-104X, may be direct or indirect using one or more communication protocols. As an example, gaming devices 104A-104X and the server computers 102 can communicate over one or more communication networks, such as over the Internet through a website maintained by a computer on a remote server or over an online data network including commercial online service providers, Internet service providers, private networks (e.g., local area networks and enterprise networks), and the like (e.g., wide area networks). The communication networks could allow gaming devices 104A-104X to communicate with one another and/or the server computers 102 using a variety of communication-based technologies, such as radio frequency (RF) (e.g., wireless fidelity (WiFi®) and Bluetooth®), cable TV, satellite links and the like.

In some implementation, server computers 102 may not be necessary and/or preferred. For example, in one or more implementations, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The mechanical reels 130 are independently spun and stopped to show a set of symbols within the gaming display area 118 which may be used to determine an outcome to the game.

In many configurations, the gaming device 104A may have a main display 128 (e.g., video display monitor) mounted to, or above, the gaming display area 118. The main display 128 can be a high-resolution liquid crystal display (LCD), plasma, light emitting diode (LED), or organic light emitting diode (OLED) panel which may be flat or curved as shown, a cathode ray tube, or other conventional electronically controlled video monitor.

In some implementations, the bill validator 124 may also function as a "ticket-in" reader that allows the player to use a casino issued credit ticket to load credits onto the gaming device 104A (e.g., in a cashless ticket ("TITO") system). In such cashless implementations, the gaming device 104A may also include a "ticket-out" printer 126 for outputting a credit ticket when a "cash out" button is pressed. Cashless TITO systems are used to generate and track unique barcodes or other indicators printed on tickets to allow players to avoid the use of bills and coins by loading credits using a ticket reader and cashing out credits using a ticket-out printer 126 on the gaming device 104A. The gaming device 104A can have hardware meters for purposes including ensuring regulatory compliance and monitoring the player credit balance. In addition, there can be additional meters that record the total amount of money wagered on the gaming device, total amount of money deposited, total amount of money withdrawn, total amount of winnings on gaming device 104A.

In some implementations, a player tracking card reader 144, a transceiver for wireless communication with a mobile device (e.g., a player's smartphone), a keypad 146, and/or an illuminated display 148 for reading, receiving, entering, and/or displaying player tracking information is provided in gaming device 104A. In such implementations, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some implementations, the information panel(s) 152 may be implemented as an additional video display.

Gaming devices 104A have traditionally also included a handle 132 typically mounted to the side of main cabinet 116 which may be used to initiate game play.

Figure 2A:
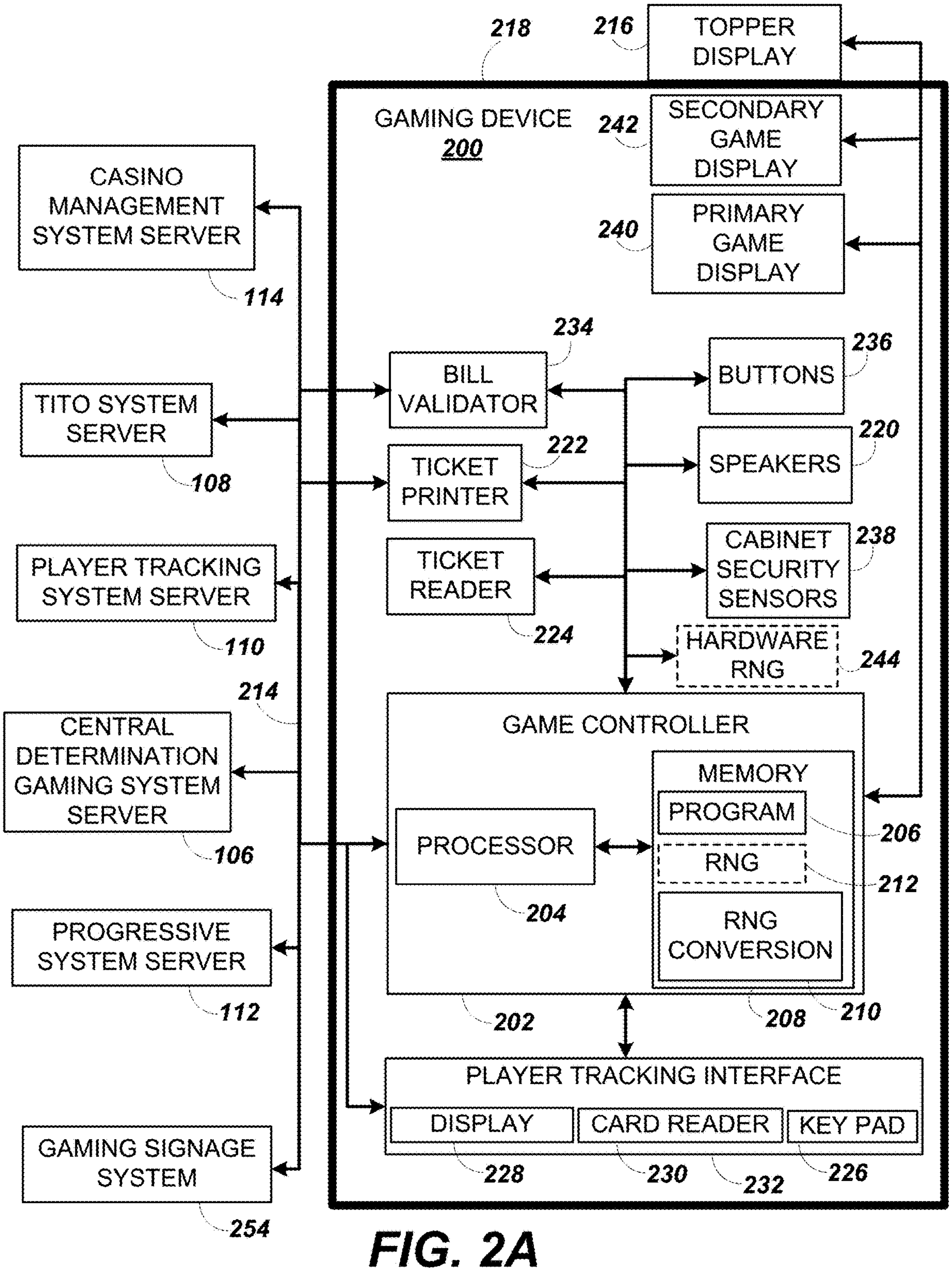
FIG. 2A is a block diagram showing various functional elements of an exemplary EGM.

Many or all the above described components can be controlled by circuitry (e.g., a game controller) housed inside the main cabinet 116 of the gaming device 104A, the details of which are shown in FIG. 2A.

An alternative example gaming device 104B illustrated in FIG. 1 is the Arc™ model gaming device manufactured by Aristocrat® Technologies, Inc. Note that where possible, reference numerals identifying similar features of the gaming device 104A implementation are also identified in the gaming device 104B implementation using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some implementations, the optional topper screen 140 may also or alternatively be used to display progressive jackpot prizes available to a player during play of gaming device 104B.

Example gaming device 104B includes a main cabinet 116 including a main door which opens to provide access to the interior of the gaming device 104B. The main or service door is typically used by service personnel to refill the ticket-out printer 126 and collect bills and tickets inserted into the bill validator 124. The main or service door may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the main display 128A may have a curvature radius from top to bottom, or alternatively from side to side. In some implementations, main display 128A is a flat panel display. Main display 128A is typically used for primary game play while secondary display 128B is typically used for bonus game play, to show game features or attraction activities while the game is not in play or any other information or media desired by the game designer or operator. In some implementations, example gaming device 104C may also include speakers 142 to output various audio such as game sound, background music, etc.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2A is a block diagram depicting exemplary internal electronic components of a gaming device 200 connected to various external systems. All or parts of the gaming device 200 shown could be used to implement any one of the example gaming devices 104A-X depicted in FIG. 1. As shown in FIG. 2A, gaming device 200 includes a topper display 216 or another form of a top box (e.g., a topper wheel, a topper screen, etc.) that sits above cabinet 218. Cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. FIG. 2 also depicts utilizing a ticket printer 222 to print tickets for a TITO system server 108. Gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

The games available for play on the gaming device 200 are controlled by a game controller 202 that includes one or more processors 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processors and/or one or more specialized processors. Although FIG. 2A illustrates that game controller 202 includes a single processor 204, game controller 202 is not limited to this representation and instead can include multiple processors 204 (e.g., two or more processors).

FIG. 2A illustrates that processor 204 is operatively coupled to memory 208. Memory 208 is defined herein as including volatile and nonvolatile memory and other types of non-transitory data storage components. Volatile memory is memory that do not retain data values upon loss of power. Nonvolatile memory is memory that do retain data upon a loss of power. Examples of memory 208 include random access memory (RAM), read-only memory (ROM), hard disk drives, solid-state drives, universal serial bus (USB) flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random access memory (SRAM), dynamic random access memory (DRAM), magnetic random access memory (MRAM), and other such devices. Examples of ROM include a programmable read-only memory (PROM), an erasable programmable read-only memory (EPROM), an electrically erasable programmable read-only memory (EEPROM), or other like memory device. Even though FIG. 2A illustrates that game controller 202 includes a single memory 208, game controller 202 could include multiple memories 208 for storing program instructions and/or data.

Memory 208 can store one or more game programs 206 that provide program instructions and/or data for carrying out various implementations (e.g., game mechanics) described herein. Stated another way, game program 206 represents an executable program stored in any portion or component of memory 208. In one or more implementations, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

Alternatively, game programs 206 can be set up to generate one or more game instances based on instructions and/or data that gaming device 200 exchanges with one or more remote gaming devices, such as a central determination gaming system server 106 (not shown in FIG. 2A but shown in FIG. 1). For purpose of this disclosure, the term "game instance" refers to a play or a round of a game that gaming device 200 presents (e.g., via a user interface (UI)) to a player. The game instance is communicated to gaming device 200 via the network 214 and then displayed on gaming device 200. For example, gaming device 200 may execute game program 206 as video streaming software that allows the game to be displayed on gaming device 200. When a game is stored on gaming device 200, it may be loaded from memory 208 (e.g., from a read only memory (ROM)) or from the central determination gaming system server 106 to memory 208.

Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaming devices 200 that differ significantly from those of general-purpose computers. Adapting general purpose computers to function as gaming devices 200 is not simple or straightforward because of: (1) the regulatory requirements for gaming devices 200, (2) the harsh environment in which gaming devices 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

One regulatory requirement for games running on gaming device 200 generally involves complying with a certain level of randomness. Typically, gaming jurisdictions mandate that gaming devices 200 satisfy a minimum level of randomness without specifying how a gaming device 200 should achieve this level of randomness. To comply, FIG. 2A illustrates that gaming device 200 could include an RNG 212 that utilizes hardware and/or software to generate RNG outcomes that lack any pattern. The RNG operations are often specialized and non-generic in order to comply with regulatory and gaming requirements. For example, in a slot game, game program 206 can initiate multiple RNG calls to RNG 212 to generate RNG outcomes, where each RNG call and RNG outcome corresponds to an outcome for a reel. In another example, gaming device 200 can be a Class II gaming device where RNG 212 generates RNG outcomes for creating Bingo cards. In one or more implementations, RNG 212 could be one of a set of RNGs operating on gaming device 200. More generally, an output of the RNG 212 can be the basis on which game outcomes are determined by the game controller 202. Game developers could vary the degree of true randomness for each RNG (e.g., pseudorandom) and utilize specific RNGs depending on game requirements. The output of the RNG 212 can include a random number or pseudorandom number (either is generally referred to as a "random number").

In FIG. 2A, RNG 212 and hardware RNG 244 are shown in dashed lines to illustrate that RNG 212, hardware RNG 244, or both can be included in gaming device 200. In one implementation, instead of including RNG 212, gaming device 200 could include a hardware RNG 244 that generates RNG outcomes. Analogous to RNG 212, hardware RNG 244 performs specialized and non-generic operations in order to comply with regulatory and gaming requirements. For example, because of regulation requirements, hardware RNG 244 could be a random number generator that securely produces random numbers for cryptography use. The gaming device 200 then uses the secure random numbers to generate game outcomes for one or more game features. In another implementation, the gaming device 200 could include both hardware RNG 244 and RNG 212. RNG 212 may utilize the RNG outcomes from hardware RNG 244 as one of many sources of entropy for generating secure random numbers for the game features.

Another regulatory requirement for running games on gaming device 200 includes ensuring a certain level of RTP. Similar to the randomness requirement discussed above, numerous gaming jurisdictions also mandate that gaming device 200 provides a minimum level of RTP (e.g., RTP of at least 75%). A game can use one or more lookup tables (also called weighted tables) as part of a technical solution that satisfies regulatory requirements for randomness and RTP. In particular, a lookup table can integrate game features (e.g., trigger events for special modes or bonus games; newly introduced game elements such as extra reels, new symbols, or new cards; stop positions for dynamic game elements such as spinning reels, spinning wheels, or shifting reels; or card selections from a deck) with random numbers generated by one or more RNGs, so as to achieve a given level of volatility for a target level of RTP. (In general, volatility refers to the frequency or probability of an event such as a special mode, payout, etc. For example, for a target level of RTP, a higher-volatility game may have a lower payout most of the time with an occasional bonus having a very high payout, while a lower-volatility game has a steadier payout with more frequent bonuses of smaller amounts.) Configuring a lookup table can involve engineering decisions with respect to how RNG outcomes are mapped to game outcomes for a given game feature, while still satisfying regulatory requirements for RTP. Configuring a lookup table can also involve engineering decisions about whether different game features are combined in a given entry of the lookup table or split between different entries (for the respective game features), while still satisfying regulatory requirements for RTP and allowing for varying levels of game volatility.

FIG. 2A illustrates that gaming device 200 includes an RNG conversion engine 210 that translates the RNG outcome from RNG 212 to a game outcome presented to a player. To meet a designated RTP, a game developer can set up the RNG conversion engine 210 to utilize one or more lookup tables to translate the RNG outcome to a symbol element, stop position on a reel strip layout, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table to map the RNG outcome to a game outcome displayed to a player and a second lookup table as a pay table for determining the prize payout amount for each game outcome. The mapping between the RNG outcome to the game outcome controls the frequency in hitting certain prize payout amounts.

FIG. 2A also depicts that gaming device 200 is connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

When a player wishes to play the gaming device 200, he/she can insert cash or a ticket voucher through a coin acceptor (not shown) or bill validator 234 to establish a credit balance on the gaming device. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views with one or more UIs, the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Additionally, or alternatively, gaming devices 104A-104X and 200 can include or be coupled to one or more wireless transmitters, receivers, and/or transceivers (not shown in FIGS. 1 and 2A) that communicate (e.g., Bluetooth® or other near-field communication technology) with one or more mobile devices to perform a variety of wireless operations in a casino environment. Examples of wireless operations in a casino environment include detecting the presence of mobile devices, performing credit, points, comps, or other marketing or hard currency transfers, establishing wagering sessions, and/or providing a personalized casino-based experience using a mobile application. In one implementation, to perform these wireless operations, a wireless transmitter or transceiver initiates a secure wireless connection between a gaming device 104A-104X and 200 and a mobile device. After establishing a secure wireless connection between the gaming device 104A-104X and 200 and the mobile device, the wireless transmitter or transceiver does not send and/or receive application data to and/or from the mobile device. Rather, the mobile device communicates with gaming devices 104A-104X and 200 using another wireless connection (e.g., WiFi® or cellular network). In another implementation, a wireless transceiver establishes a secure connection to directly communicate with the mobile device. The mobile device and gaming device 104A-104X and 200 sends and receives data utilizing the wireless transceiver instead of utilizing an external network. For example, the mobile device would perform digital wallet transactions by directly communicating with the wireless transceiver. In one or more implementations, a wireless transmitter could broadcast data received by one or more mobile devices without establishing a pairing connection with the mobile devices.

Although FIGS. 1 and 2A illustrate specific implementations of a gaming device (e.g., gaming devices 104A-104X and 200), the disclosure is not limited to those implementations shown in FIGS. 1 and 2. For example, not all gaming devices suitable for implementing implementations of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or tabletops and have displays that face upwards. Gaming devices 104A-104X and 200 may also include other processors that are not separately shown. Using FIG. 2A as an example, gaming device 200 could include display controllers (not shown in FIG. 2A) configured to receive video input signals or instructions to display images on game displays 240 and 242. Alternatively, such display controllers may be integrated into the game controller 202. The use and discussion of FIGS. 1 and 2 are examples to facilitate ease of description and explanation.

Figure 2B:
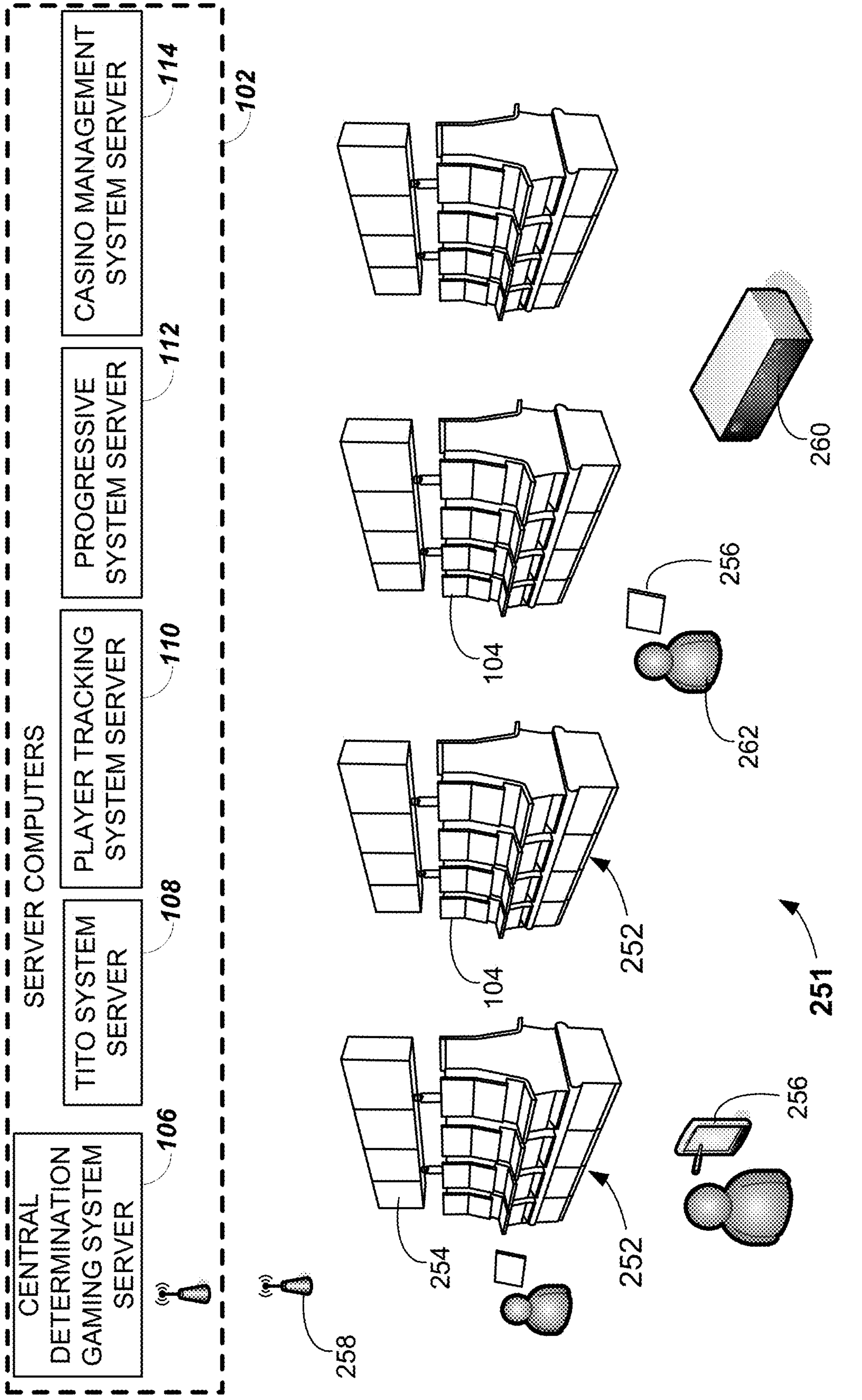
FIG. 2B depicts a casino gaming environment according to one example.

FIG. 2B depicts a casino gaming environment according to one example. In this example, the casino 251 includes banks 252 of EGMs 104. In this example, each bank 252 of EGMs 104 includes a corresponding gaming signage system 254 (also shown in FIG. 2A). According to this implementation, the casino 251 also includes mobile gaming devices 256, which are also configured to present wagering games in this example. The mobile gaming devices 256 may, for example, include tablet devices, cellular phones, smart phones and/or other handheld devices. In this example, the mobile gaming devices 256 are configured for communication with one or more other devices in the casino 251, including but not limited to one or more of the server computers 102, via wireless access points 258.

According to some examples, the mobile gaming devices 256 may be configured for stand-alone determination of game outcomes. However, in some alternative implementations the mobile gaming devices 256 may be configured to receive game outcomes from another device, such as the central determination gaming system server 106, one of the EGMs 104, etc.

Some mobile gaming devices 256 may be configured to accept monetary credits from a credit or debit card, via a wireless interface (e.g., via a wireless payment app), via tickets, via a patron casino account, etc. However, some mobile gaming devices 256 may not be configured to accept monetary credits via a credit or debit card. Some mobile gaming devices 256 may include a ticket reader and/or a ticket printer whereas some mobile gaming devices 256 may not, depending on the particular implementation.

In some implementations, the casino 251 may include one or more kiosks 260 that are configured to facilitate monetary transactions involving the mobile gaming devices 256, which may include cash out and/or cash in transactions. The kiosks 260 may be configured for wired and/or wireless communication with the mobile gaming devices 256. The kiosks 260 may be configured to accept monetary credits from casino patrons 262 and/or to dispense monetary credits to casino patrons 262 via cash, a credit or debit card, via a wireless interface (e.g., via a wireless payment app), via tickets, etc. According to some examples, the kiosks 260 may be configured to accept monetary credits from a casino patron and to provide a corresponding amount of monetary credits to a mobile gaming device 256 for wagering purposes, e.g., via a wireless link such as a near-field communications link. In some such examples, when a casino patron 262 is ready to cash out, the casino patron 262 may select a cash out option provided by a mobile gaming device 256, which may include a real button or a virtual button (e.g., a button provided via a graphical user interface) in some instances. In some such examples, the mobile gaming device 256 may send a "cash out" signal to a kiosk 260 via a wireless link in response to receiving a "cash out" indication from a casino patron. The kiosk 260 may provide monetary credits to the casino patron 262 corresponding to the "cash out" signal, which may be in the form of cash, a credit ticket, a credit transmitted to a financial account corresponding to the casino patron, etc.

In some implementations, a cash-in process and/or a cash-out process may be facilitated by the TITO system server 108. For example, the TITO system server 108 may control, or at least authorize, ticket-in and ticket-out transactions that involve a mobile gaming device 256 and/or a kiosk 260.

Some mobile gaming devices 256 may be configured for receiving and/or transmitting player loyalty information. For example, some mobile gaming devices 256 may be configured for wireless communication with the player tracking system server 110. Some mobile gaming devices 256 may be configured for receiving and/or transmitting player loyalty information via wireless communication with a patron's player loyalty card, a patron's smartphone, etc.

According to some implementations, a mobile gaming device 256 may be configured to provide safeguards that prevent the mobile gaming device 256 from being used by an unauthorized person. For example, some mobile gaming devices 256 may include one or more biometric sensors and may be configured to receive input via the biometric sensor (s) to verify the identity of an authorized patron. Some mobile gaming devices 256 may be configured to function only within a predetermined or configurable area, such as a casino gaming area.

Figure 2C:
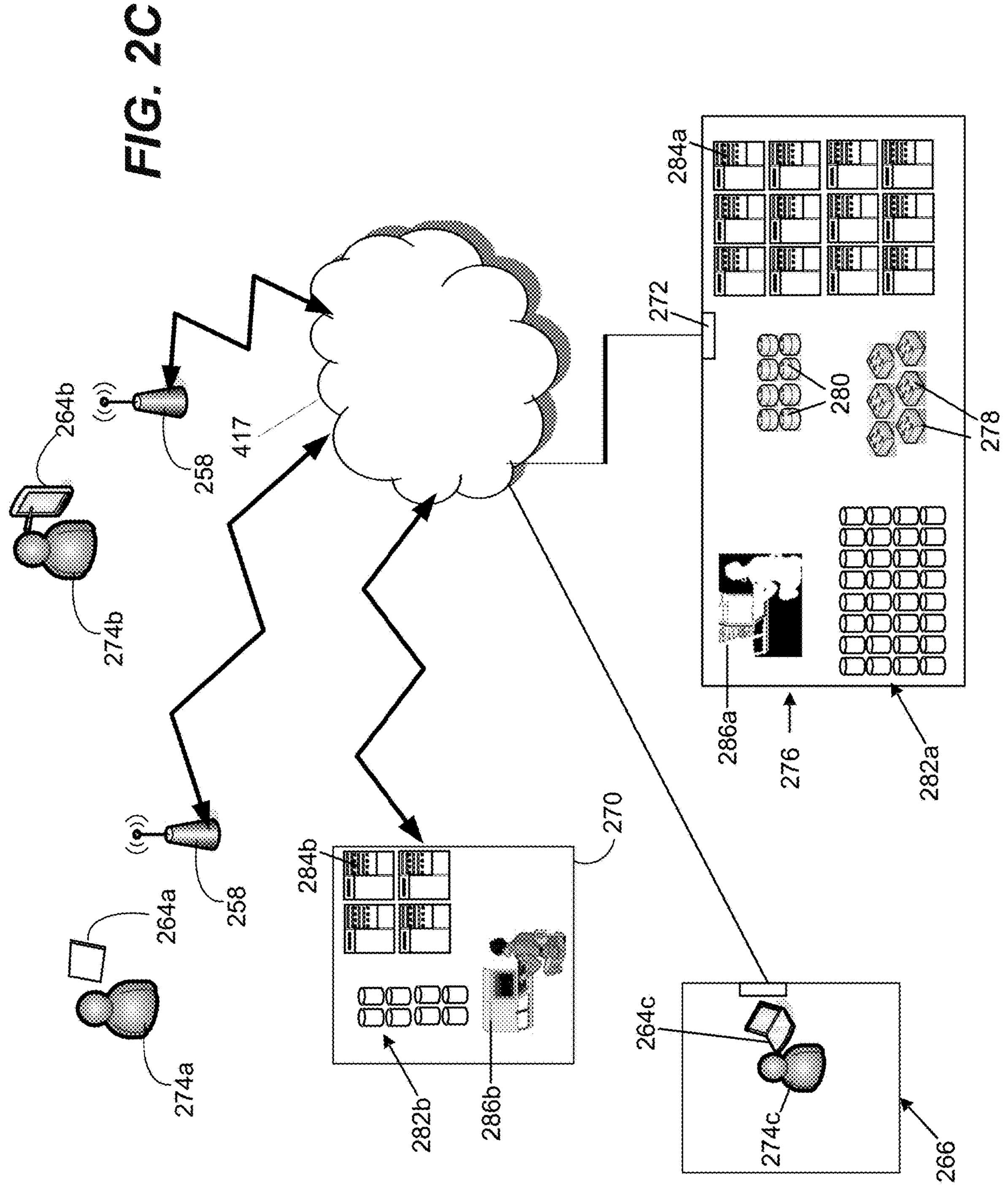
FIG. 2C is a diagram that shows examples of components of a system for providing online gaming according to some aspects of the present disclosure.

FIG. 2C is a diagram that shows examples of components of a system for providing online gaming according to some aspects of the present disclosure. As with other figures presented in this disclosure, the numbers, types and arrangements of gaming devices shown in FIG. 2C are merely shown by way of example. In this example, various gaming devices, including but not limited to end user devices (EUDs) 264*a*, 264*b* and 264*c* are capable of communication via one or more networks 417. The networks 417 may, for example, include one or more cellular telephone networks, the Internet, etc. In this example, the EUDs 264*a* and 264*b* are mobile devices: according to this example the EUD 264*a* is a tablet device and the EUD 264*b* is a smart phone. In this implementation, the EUD 264*c* is a laptop computer that is located within a residence 266 at the time depicted in FIG. 2C. Accordingly, in this example the hardware of EUDs is not specifically configured for online gaming, although each EUD is configured with software for online gaming. For example, each EUD may be configured with a web browser. Other implementations may include other types of EUD, some of which may be specifically configured for online gaming.

In this example, a gaming data center 276 includes various devices that are configured to provide online wagering games via the networks 417. The gaming data center 276 is capable of communication with the networks 417 via the gateway 272. In this example, switches 278 and routers 280 are configured to provide network connectivity for devices of the gaming data center 276, including storage devices 282*a*, servers 284*a* and one or more workstations 570*a*. The servers 284*a* may, for example, be configured to provide access to a library of games for online game play. In some examples, code for executing at least some of the games may initially be stored on one or more of the storage devices 282*a*. The code may be subsequently loaded onto a server 284*a* after selection by a player via an EUD and communication of that selection from the EUD via the networks 417. The server 284*a* onto which code for the selected game has been loaded may provide the game according to selections made by a player and indicated via the player's EUD. In other examples, code for executing at least some of the games may initially be stored on one or more of the servers 284*a*. Although only one gaming data center 276 is shown in FIG. 2C, some implementations may include multiple gaming data centers 276.

In this example, a financial institution data center 270 is also configured for communication via the networks 417. Here, the financial institution data center 270 includes servers 284*b*, storage devices 282*b*, and one or more workstations 286*b*. According to this example, the financial institution data center 270 is configured to maintain financial accounts, such as checking accounts, savings accounts, loan accounts, etc. In some implementations one or more of the authorized users 274*a*-274*c* may maintain at least one financial account with the financial institution that is serviced via the financial institution data center 270.

According to some implementations, the gaming data center 276 may be configured to provide online wagering games in which money may be won or lost. According to some such implementations, one or more of the servers 284*a* may be configured to monitor player credit balances, which may be expressed in game credits, in currency units, or in any other appropriate manner. In some implementations, the server(s) 284*a* may be configured to obtain financial credits from and/or provide financial credits to one or more financial institutions, according to a player's "cash in" selections, wagering game results and a player's "cash out" instructions. According to some such implementations, the server (s) 284*a* may be configured to electronically credit or debit the account of a player that is maintained by a financial institution, e.g., an account that is maintained via the financial institution data center 270. The server(s) 284*a* may, in some examples, be configured to maintain an audit record of such transactions.

In some alternative implementations, the gaming data center 276 may be configured to provide online wagering games for which credits may not be exchanged for cash or the equivalent. In some such examples, players may purchase game credits for online game play, but may not "cash out" for monetary credit after a gaming session. Moreover, although the financial institution data center 270 and the gaming data center 276 include their own servers and storage devices in this example, in some examples the financial institution data center 270 and/or the gaming data center 276 may use offsite "cloud-based" servers and/or storage devices. In some alternative examples, the financial institution data center 270 and/or the gaming data center 276 may rely entirely on cloud-based servers.

One or more types of devices in the gaming data center 276 (or elsewhere) may be capable of executing middleware, e.g., for data management and/or device communication. Authentication information, player tracking information, etc., including but not limited to information obtained by EUDs 264 and/or other information regarding authorized users of EUDs 264 (including but not limited to the authorized users 274*a*-274*c*), may be stored on storage devices 282 and/or servers 284. Other game-related information and/or software, such as information and/or software relating to leaderboards, players currently playing a game, game themes, game-related promotions, game competitions, etc., also may be stored on storage devices 282 and/or servers 284. In some implementations, some such game-related software may be available as "apps" and may be downloadable (e.g., from the gaming data center 276) by authorized users.

In some examples, authorized users and/or entities (such as representatives of gaming regulatory authorities) may obtain gaming-related information via the gaming data center 276. One or more other devices (such EUDs 264 or devices of the gaming data center 276) may act as intermediaries for such data feeds. Such devices may, for example, be capable of applying data filtering algorithms, executing data summary and/or analysis software, etc. In some implementations, data filtering, summary and/or analysis software may be available as "apps" and downloadable by authorized users.

Figure 3:
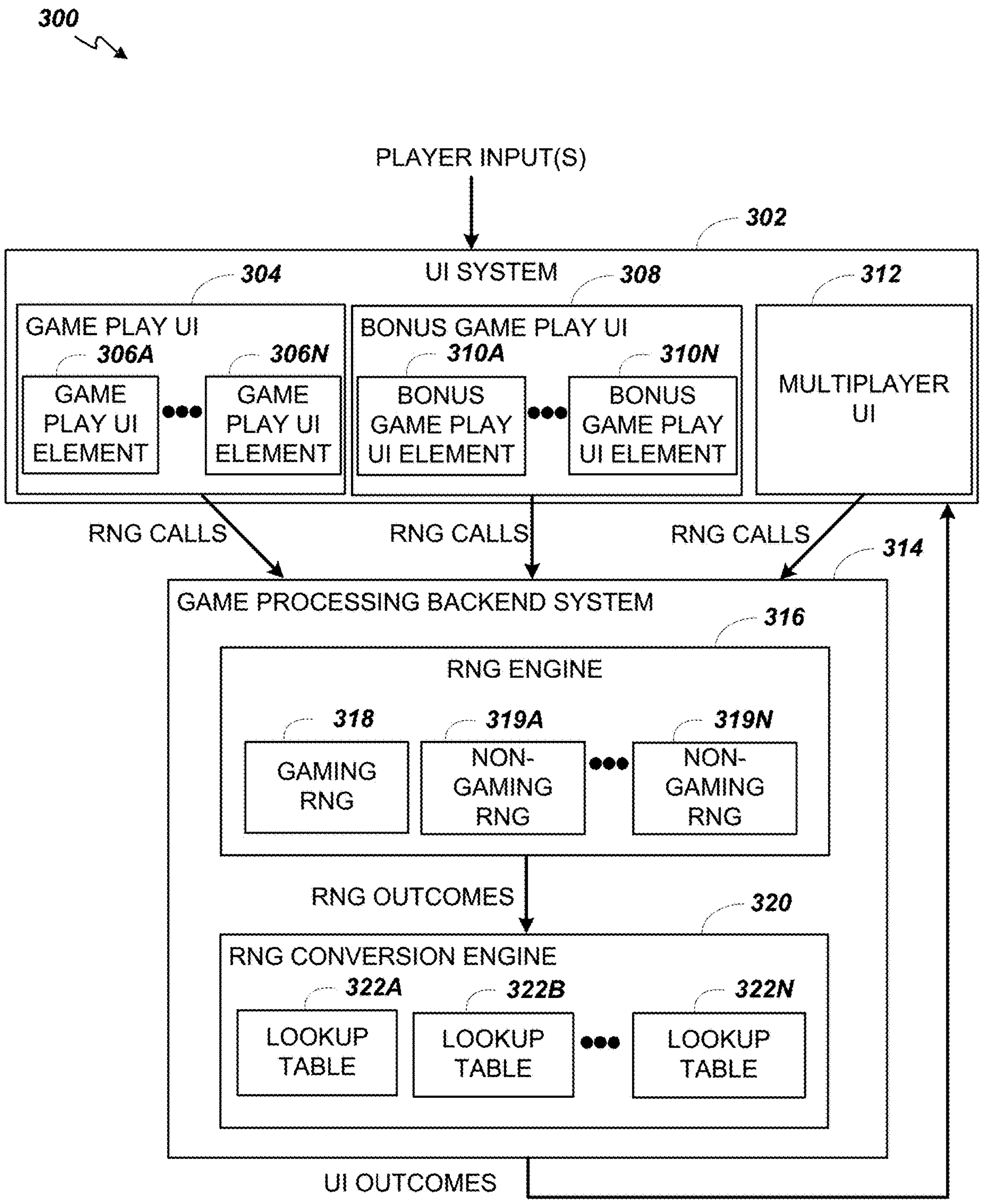
FIG. 3 illustrates, in block diagram form, an implementation of a game processing architecture algorithm that implements a game processing pipeline for the play of a game in accordance with various implementations described herein.

FIG. 3 illustrates, in block diagram form, an implementation of a game processing architecture 300 that implements a game processing pipeline for the play of a game in accordance with various implementations described herein. As shown in FIG. 3, the gaming processing pipeline starts with having a UI system 302 receive one or more player inputs for the game instance. Based on the player input(s), the UI system 302 generates and sends one or more RNG calls to a game processing backend system 314. Game processing backend system 314 then processes the RNG calls with RNG engine 316 to generate one or more RNG outcomes. The RNG outcomes are then sent to the RNG conversion engine 320 to generate one or more game outcomes for the UI system 302 to display to a player. The game processing architecture 300 can implement the game processing pipeline using a gaming device, such as gaming devices 104A-104X and 200 shown in FIGS. 1 and 2, respectively. Alternatively, portions of the gaming processing architecture 300 can implement the game processing pipeline using a gaming device and one or more remote gaming devices, such as central determination gaming system server 106 shown in FIG. 1.

The UI system 302 includes one or more UIs that a player can interact with. The UI system 302 could include one or more game play UIs 304, one or more bonus game play UIs 308, and one or more multiplayer UIs 312, where each UI type includes one or more mechanical UIs and/or graphical UIs (GUIs). In other words, game play UI 304, bonus game play UI 308, and the multiplayer UI 312 may utilize a variety of UI elements, such as mechanical UI elements (e.g., physical "spin" button or mechanical reels) and/or GUI elements (e.g., virtual reels shown on a video display or a virtual button deck) to receive player inputs and/or present game play to a player. Using FIG. 3 as an example, the different UI elements are shown as game play UI elements 306A-306N and bonus game play UI elements 310A-310N.

The game play UI 304 represents a UI that a player typically interfaces with for a base game. During a game instance of a base game, the game play UI elements 306A-306N (e.g., GUI elements depicting one or more virtual reels) are shown and/or made available to a user. In a subsequent game instance, the UI system 302 could transition out of the base game to one or more bonus games. The bonus game play UI 308 represents a UI that utilizes bonus game play UI elements 310A-310N for a player to interact with and/or view during a bonus game. In one or more implementations, at least some of the game play UI element 306A-306N are similar to the bonus game play UI elements 310A-310N. In other implementations, the game play UI element 306A-306N can differ from the bonus game play UI elements 310A-310N.

FIG. 3 also illustrates that UI system 302 could include a multiplayer UI 312 purposed for game play that differs or is separate from the typical base game. For example, multiplayer UI 312 could be set up to receive player inputs and/or presents game play information relating to a tournament mode. When a gaming device transitions from a primary game mode that presents the base game to a tournament mode, a single gaming device is linked and synchronized to other gaming devices to generate a tournament outcome. For example, multiple RNG engines 316 corresponding to each gaming device could be collectively linked to determine a tournament outcome. To enhance a player's gaming experience, tournament mode can modify and synchronize sound, music, reel spin speed, and/or other operations of the gaming devices according to the tournament game play. After tournament game play ends, operators can switch back the gaming device from tournament mode to a primary game mode to present the base game. Although FIG. 3 does not explicitly depict that multiplayer UI 312 includes UI elements, multiplayer UI 312 could also include one or more multiplayer UI elements.

Based on the player inputs, the UI system 302 could generate RNG calls to a game processing backend system 314. As an example, the UI system 302 could use one or more application programming interfaces (APIs) to generate the RNG calls. To process the RNG calls, the RNG engine 316 could utilize gaming RNG 318 and/or non-gaming RNGs 319A-319N. Gaming RNG 318 could corresponds to RNG 212 or hardware RNG 244 shown in FIG. 2A. As previously discussed with reference to FIG. 2A, gaming RNG 318 often performs specialized and non-generic operations that comply with regulatory and/or game requirements. For example, because of regulation requirements, gaming RNG 318 could correspond to RNG 212 by being a cryptographic RNG or pseudorandom number generator (PRNG) (e.g., Fortuna PRNG) that securely produces random numbers for one or more game features. To securely generate random numbers, gaming RNG 318 could collect random data from various sources of entropy, such as from an operating system (OS) and/or a hardware RNG (e.g., hardware RNG 244 shown in FIG. 2A). Alternatively, non-gaming RNGs 319A-319N may not be cryptographically secure and/or be computationally less expensive. Non-gaming RNGs 319A-319N can, thus, be used to generate outcomes for non-gaming purposes. As an example, non-gaming RNGs 319A-319N can generate random numbers for generating random messages that appear on the gaming device.

The RNG conversion engine 320 processes each RNG outcome from RNG engine 316 and converts the RNG outcome to a UI outcome that is feedback to the UI system 302. With reference to FIG. 2A, RNG conversion engine 320 corresponds to RNG conversion engine 210 used for game play. As previously described, RNG conversion engine 320 translates the RNG outcome from the RNG 212 to a game outcome presented to a player. RNG conversion engine 320 utilizes one or more lookup tables 322A-322N to regulate a prize payout amount for each RNG outcome and how often the gaming device pays out the derived prize payout amounts. In one example, the RNG conversion engine 320 could utilize one lookup table to map the RNG outcome to a game outcome displayed to a player and a second lookup table as a pay table for determining the prize payout amount for each game outcome. In this example, the mapping between the RNG outcome and the game outcome controls the frequency in hitting certain prize payout amounts. Different lookup tables could be utilized depending on the different game modes, for example, a base game versus a bonus game.

After generating the UI outcome, the game processing backend system 314 sends the UI outcome to the UI system 302. Examples of UI outcomes are symbols to display on a video reel or reel stops for a mechanical reel. In one example, if the UI outcome is for a base game, the UI system 302 updates one or more game play UI elements 306A-306N, such as symbols, for the game play UI 304. In another example, if the UI outcome is for a bonus game, the UI system could update one or more bonus game play UI elements 310A-310N (e.g., symbols) for the bonus game play UI 308. In response to updating the appropriate UI, the player may subsequently provide additional player inputs to initiate a subsequent game instance that progresses through the game processing pipeline.

Figure 4A:
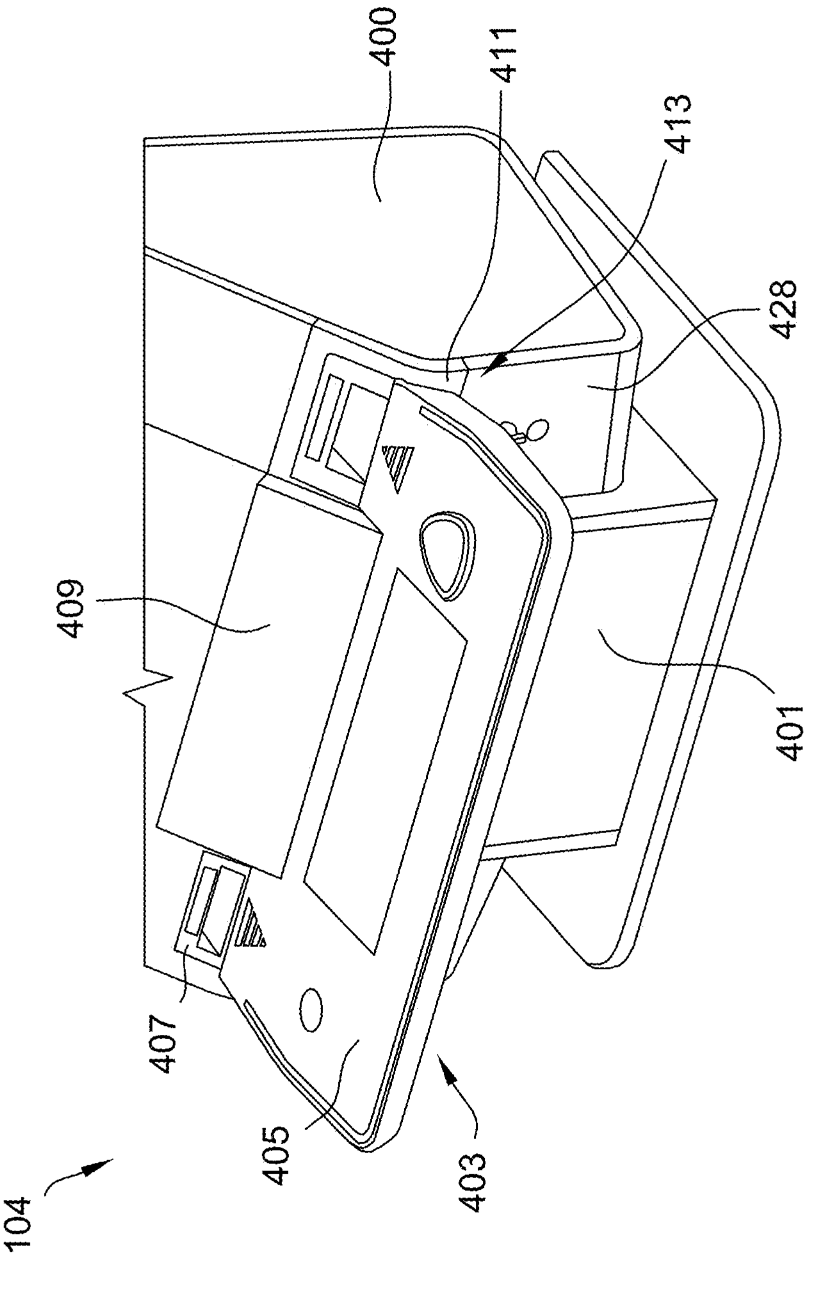
Figure 4B:
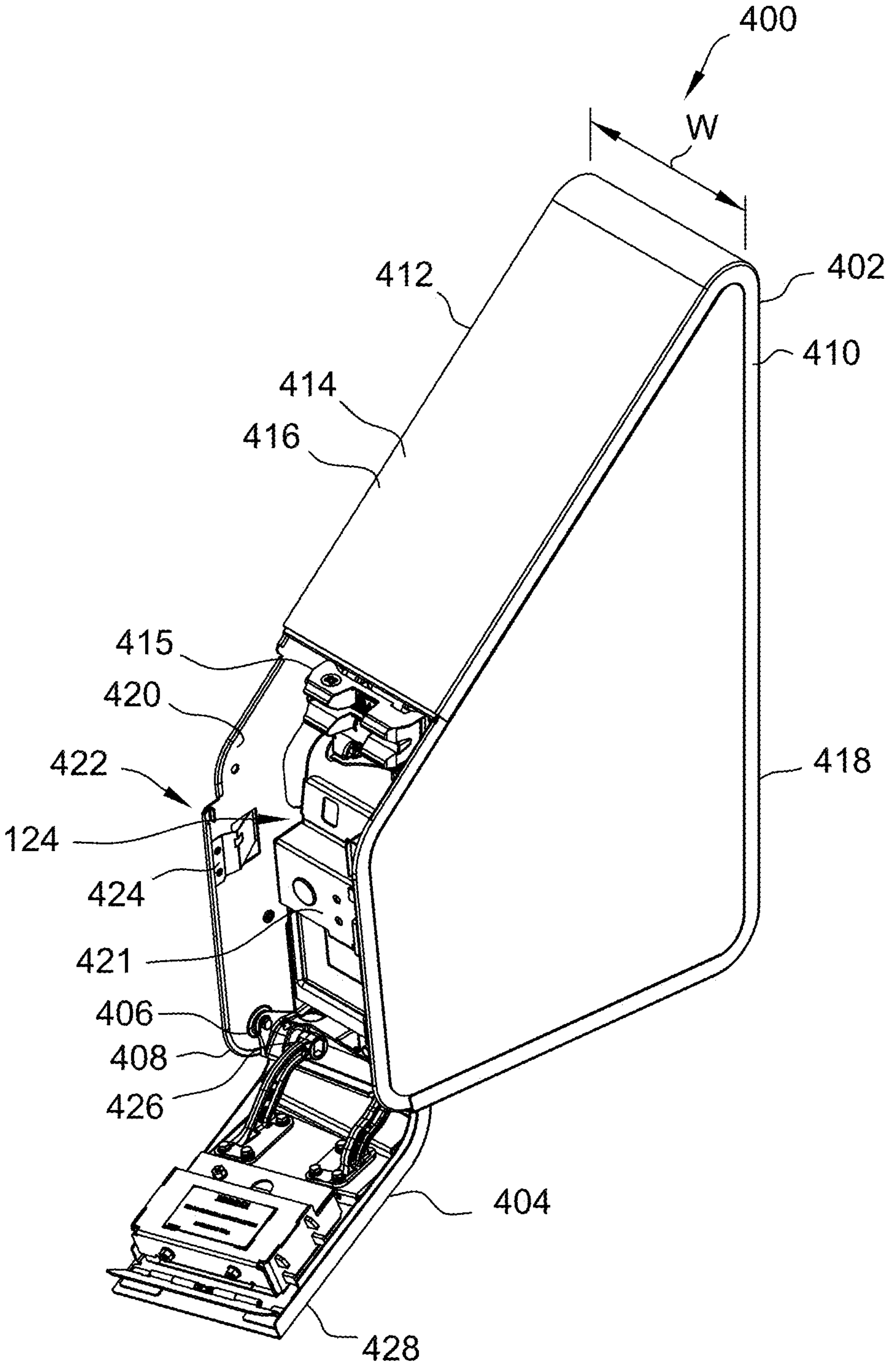
FIG. 4B is a perspective view of the enclosure assembly shown in FIG. 4A.
Figure 5:
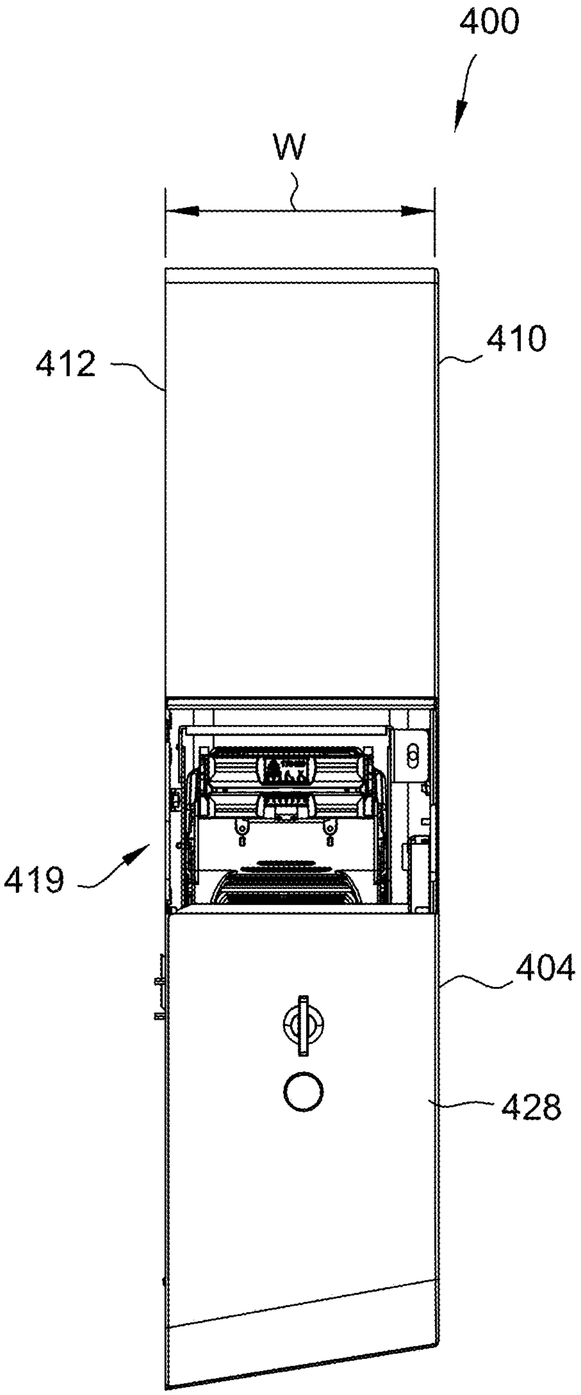
FIG. 5 is a front view of the enclosure assembly shown in FIG. 4B.
Figure 6:
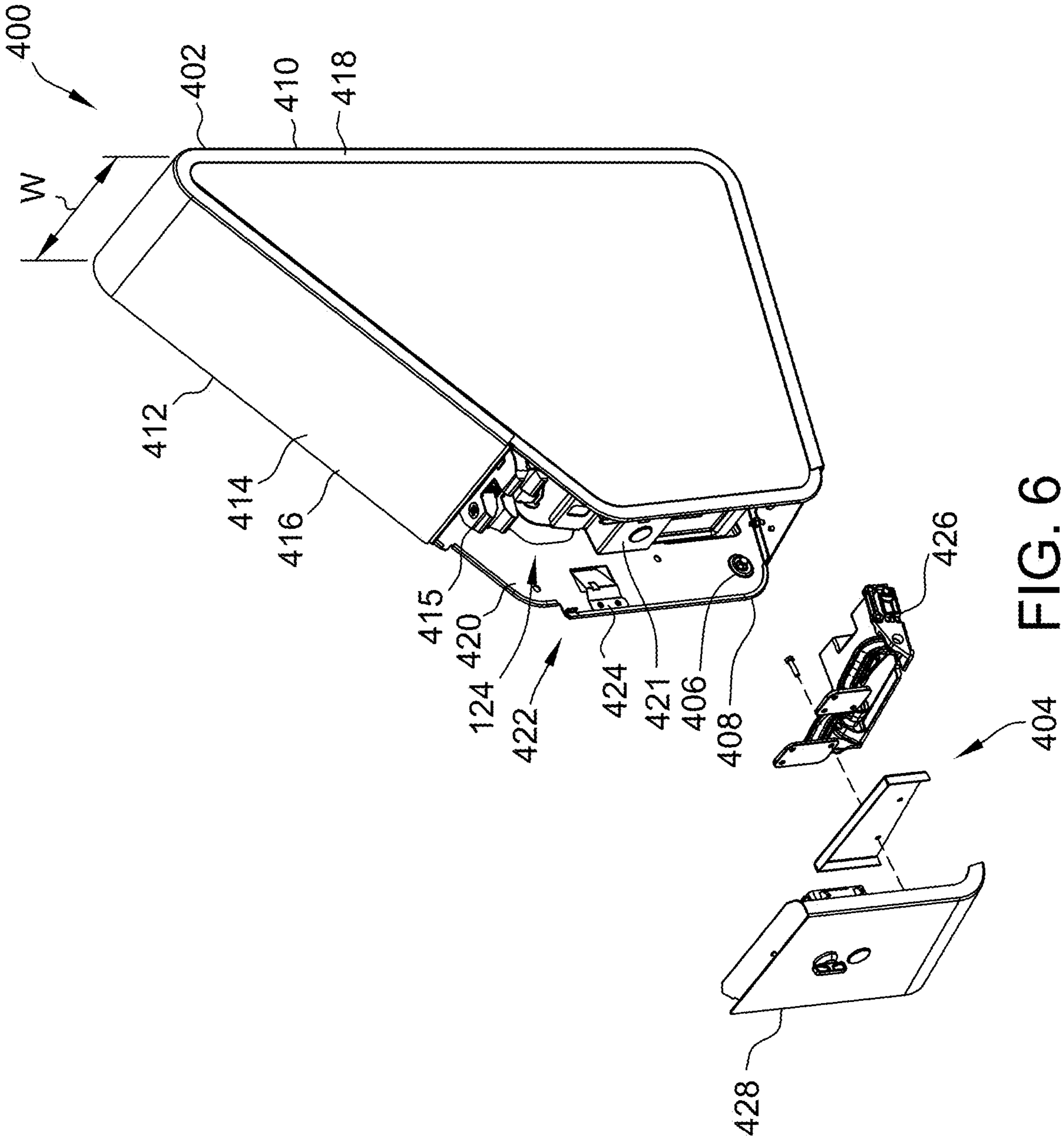
FIG. 6 is an exploded view of the enclosure assembly shown in FIG. 4B.

FIG. 4A is a perspective view of a portion of an EGM 104 that includes a mechanical enclosure assembly 400 for securely housing a currency acceptor, such as a bill validator or bank notes acceptor 124 (shown in FIG. 4B), a ticket printer 126, and/or any other currency or ticket printing and/or accepting device. FIG. 4B is a perspective view of enclosure assembly 400 shown in FIG. 4A. FIG. 5 is a front view of enclosure assembly 400. FIG. 6 is an exploded view of enclosure assembly 400.

Referring to FIG. 4A, EGM 104 includes a cabinet 401 and a button deck door assembly 403 coupled to cabinet 401. Button deck door assembly 403 is moveable relative to cabinet 401 (e.g., rotated outwards from cabinet 401 in the example embodiment) between a closed position, as shown in FIG. 4A, and an open position (not shown). When in the open position, an interior of cabinet 401 is accessible to an operator. Button deck door assembly 403 includes a button deck 405, a ticket out printer cover 407, a button deck display 409 and a BNA cover 411. Enclosure assembly 400 includes a door 428 for providing access to an interior portion 420 (shown in FIG. 5). Enclosure assembly 400 does not rotate with button deck door assembly 403. When button deck door assembly 403 is in the closed position, as shown in FIG. 4A, a slight gap 413 is defined between BNA cover 411 and door 428. When button deck door assembly 403 is rotated to the open position, BNA cover 411 is moved from enclosure assembly 400, exposing an enclosure opening 419 (shown in FIG. 5).

Enclosure assembly 400 may be removably positioned within and/or attached to EGM 104, such as within an internal channel or receptacle of a EGM 104, or attached at a side of cabinet 401, as shown in the example embodiment. Referring to FIG. 4B, during operation, the BNA 124 may receive paper currency and/or paper tickets through an insert in BNA cover 411 (shown in FIG. 4A) at a bill scanner 415 of BNA 124, which may be stacked and/or stored within a bill cassette or cashbox 421 of the BNA 124. Periodically, a service technician may remove BNA 124 from EGM 104 to access and remove the paper currency and/or tickets stacked and stored within cashbox 421. Thereafter, the technician may replace the empty BNA 124 within the EGM 104 for continued use.

As a result of the money handling functions performed by BNA 124, in many embodiments, it is important that BNA 124 remain secure within the EGM 104. For example, it may be desirable to ensure that BNA 124 is secure against tampering, theft, and/or any other unwanted human interaction. To secure BNA 124, mechanical enclosure assembly 400 may thus be provided, which as described herein may be arranged to receive and securely contain BNA 124, while also allowing removal of BNA 124 from the EGM 104 when authorized and appropriate, such as, for example, by an authorized technician. Further, as described herein, enclosure assembly 400 may also facilitate quick, quite, and safe removal of BNA 124 from the EGM 104 by an authorized technician.

Accordingly, in the example embodiment, enclosure assembly 400 includes a housing 402 and a door assembly 404 hingeably coupled to housing 402 at a pivot point 406, such as near a lower portion 408 of housing 402. As a result, door assembly 404 is generally capable of arcuate or angular motion (e.g., opening and closing) relative to housing 402 about pivot point 406.

Referring to FIGS. 4B-6, collectively, in the example embodiment, housing 402 includes a first side wall 410, a second side wall 412 spaced apart from first side wall 410 by a width, W, and a connecting portion 414 extending between and mechanically coupling first side wall 410 and second side wall 412. As shown, housing 402 may be generally polyhedral and shaped to receive and contain BNA 124, as described herein. As a result, although a polyhedral shaping that includes a sloping portion 416 is illustrated, it will be appreciated that housing 402 may include any other shape adapted to receive BNA 124 and/or another ticket and/or currency accepting and/or printing device. For example, as shown, and in at least one embodiment, housing 402 is generally "saddlebag" shaped.

In the example embodiment, housing 402 also defines an exterior portion 418, an interior portion 420, and an opening 422. In at least some embodiments, exterior portion 418 may engage, such as in a friction or pressure fit, within a recess, a channel, and/or another compartment or receptacle of EGM 104. In other embodiments, exterior portion 418 may not be friction or pressure fit within EGM 104 but may nonetheless be positioned within a recess or channel of EGM 104. As described herein, interior portion 420 may receive and contain BNA 124.

In some embodiments, enclosure assembly 400 includes at least one engagement bracket 424 coupled to side portion 412 and extending partway into interior portion 420 of housing 402. Engagement bracket 424 may engage a prong latch 456 (shown in FIG. 8) or another corresponding engagement surface of door assembly 404. In the example embodiment, engagement bracket 424 is a stainless-steel flat spring. In some embodiments, one or more additional engagement surfaces (e.g., flat springs) may be included as well. For example, in at least one implementation, a second flat spring may be included on side portion 412 opposite flat spring 424. Further, although flat springs are described herein, it will be appreciated that any other suitable engagement mechanism, such as any pressure-fit and/or friction-fit locking or engagement mechanism, may also be used to secure BNA 124 within housing 402.

Accordingly, housing 402 may be sized and shaped to receive BNA 124 and/or, as described above, to accommodate removal and replacement of BNA 124, such as by a technician for removal of paper currency from BNA 124 during operation and/or on a periodic basis. To facilitate removal and replacement of BNA 124, housing 402 includes opening 422, the dimensions of which may be sufficient to permit placement of BNA within housing 402 as well as removal of BNA from housing 402.

As described above, enclosure assembly 400 also includes door assembly 404 hingeably coupled to housing 402 at pivot point 406, such as near lower portion 408 of housing

402. Also, as described above, door assembly 404 is generally capable of arcuate or angular motion (e.g., opening and closing) relative to housing 402 about pivot point 406.

More particularly, door assembly 404 includes a torque damper assembly 426 and a door panel 428 coupled to the torque damper assembly 426. In at least some implementations, torque damper assembly 426 may be generally configured to facilitate, and dampen, motion of door assembly 404 relative to opening 422, such that door assembly 404 is capable of opening and closing to provide access to interior portion 420 of housing 402 when door assembly 404 is open, and when door assembly 404 is closed, to at least partially occlude opening 422 and secure BNA 124 within housing 402.

Figure 7:
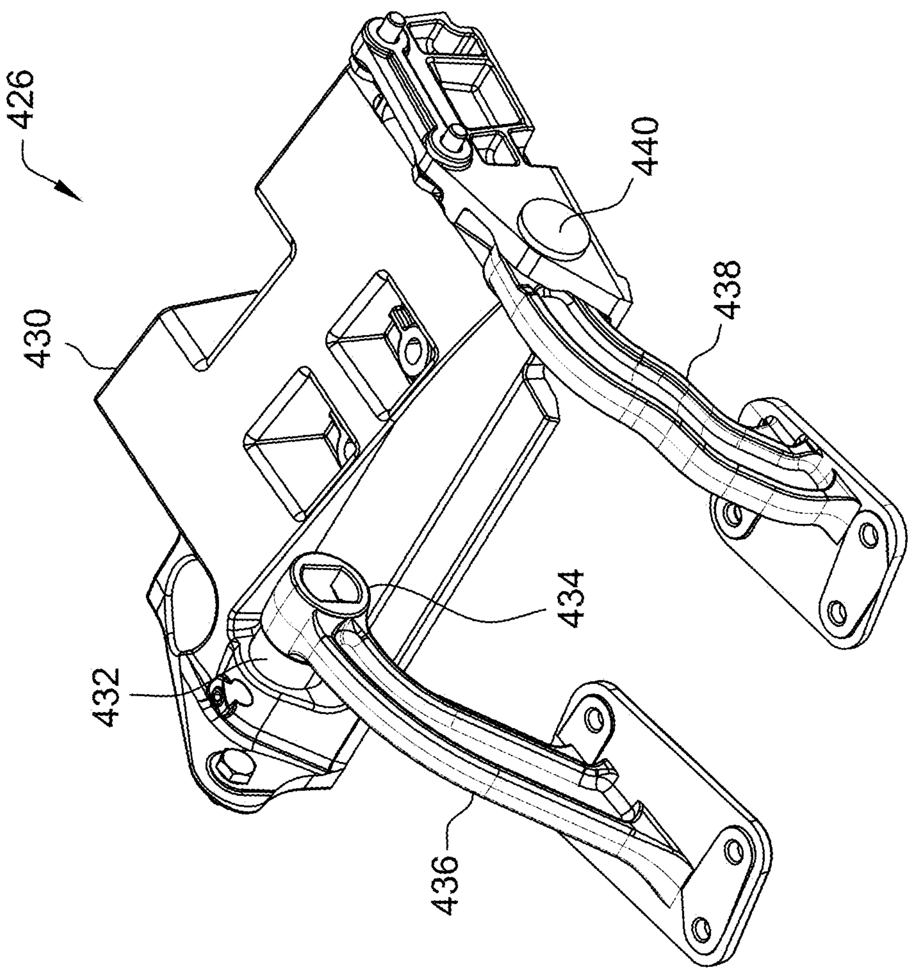
FIG. 7 is a perspective view of a torque damper assembly of the enclosure assembly shown in FIG. 4B.

Torque damper assembly 426 is shown, in additional detail, with reference to FIG. 7. Accordingly, with primary reference to FIG. 7, torque damper assembly 426 may include, in at least the example implementation, a platform 430, a torque damper 432 rotatably coupled to platform 430 at a first pivot point 434, a first arm 436 fixedly coupled to torque damper 432, and a second arm 438 rotatably coupled to platform 430 at a second pivot point 440. Although in the example implementation, second arm 438 is not coupled to a respective torque damper, in at least some embodiments, second arm 438 may also or alternatively be coupled to a torque damper (e.g., torque damper assembly 426 may include one or more torque dampers 432).

In at least some embodiments, torque damper 432 may include any suitable torque damping mechanism, such as one or more springs capable of applying a biasing force against rotation of door assembly 404 (and/or door panel 428) away from opening 422 (e.g., a biasing force that generally opposes opening of door assembly 404). In the example embodiment, torque damper 432 is a hydraulic damper. Likewise, in some embodiments, torque damper 432 may also assist closure of door assembly, such as by countering at least a portion of the weight of door assembly 404.

Moreover, in the example implementation, torque damper 432 may facilitate a generally unopposed or undamped (and thus rapid) opening of door assembly 404 through approximately two-thirds of the range of motion of door assembly 404, from a closed position to an open position. During approximately the last one-third of the range of motion of door assembly, torque damper 432 may provide a biasing or dampening force, as described above, that substantially opposes and counters at least a portion of the weight of door assembly to dampen and slow door assembly 404 in the last one-third of the range, as door assembly 404 reaches the open position. Other ranges are also contemplated by and within the scope of the present disclosure. For example, torque damper 432 may supply a biasing force in a range of about fifty percent (e.g., half-way open), and/or any other suitable range.

Figure 8:
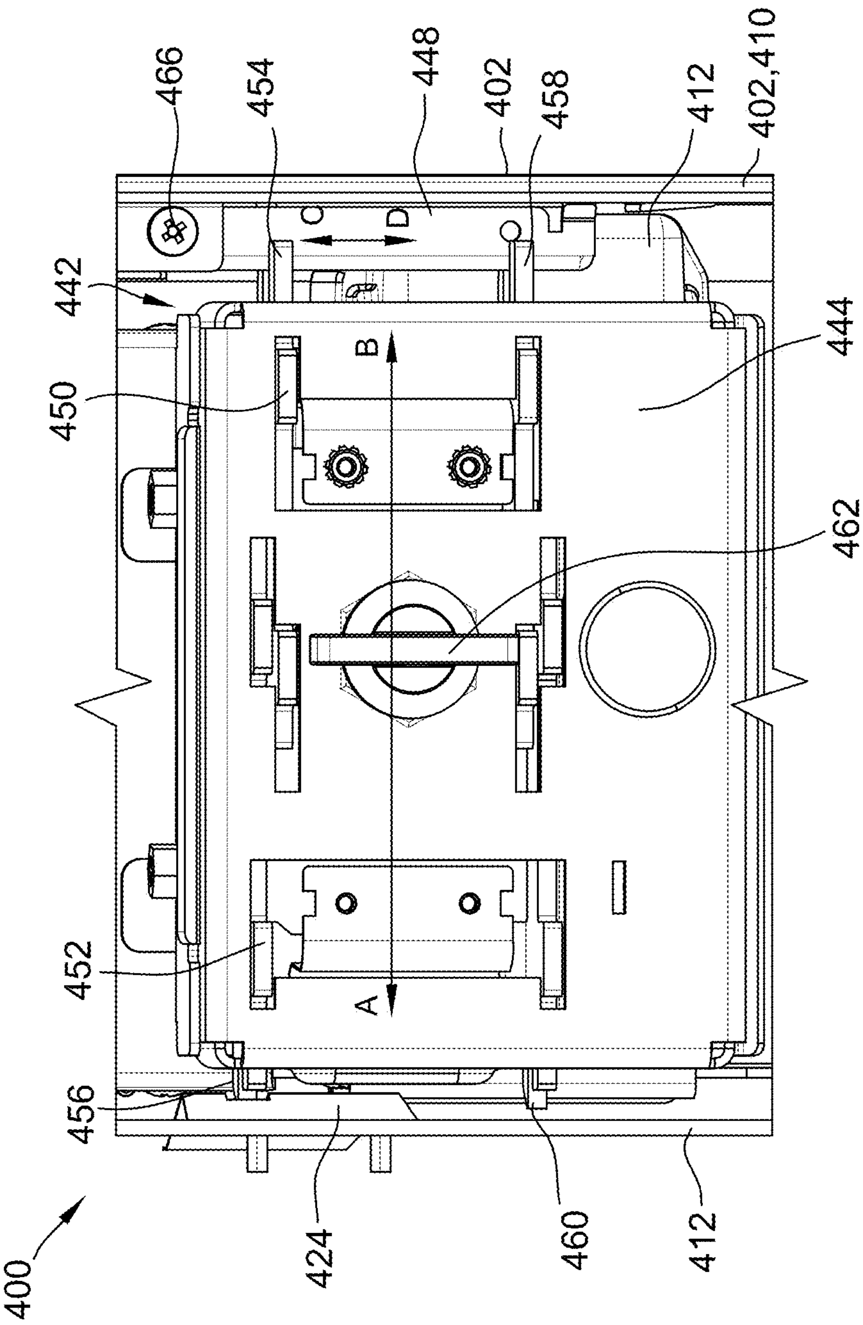
FIG. 8 is a perspective view of a portion of the enclosure assembly shown in FIG. 4A, with a door panel of the enclosure assembly removed to reveal a lock assembly.

FIG. 8 is a front view of enclosure assembly 400, with door panel 428 removed. In the example embodiment, enclosure assembly 400 further includes a lock assembly 442 for securely locking door assembly 404 in a closed position on housing 402. Lock assembly 442 includes a lock frame 444, engagement bracket 446, bore frame 448 and first and second latch blocks 450, 452. Lock frame 444 is coupled to door panel 428 (shown in FIG. 6) and supports latch blocks 450, 452 therein. First and second latch blocks 450, 452 are each slideably moveable relative to lock frame 444 between a locked position, as shown in FIG. 8, and an unlocked position (not shown). In the locked position, first and second latch blocks 450, 452 are selectively engaged with bore frame 448 and engagement bracket 446, respectively.

First and second latch blocks 450, 452 each include an upper or first prong latch 454, 456 and a lower or second prong latch 458, 460. In the example embodiment, upper and lower prong latches 454, 458 of first latch block 450 each engage bore frame 448 while only upper prong latch 456 of second latch block 452 engages engagement bracket 446. Additionally or alternatively to engagement bracket 446, enclosure assembly 400 in other embodiments may include a second engagement bracket (not shown) positioned in alignment with lower prong latch 460 of second latch block 452 and that is engaged by lower prong latch 460 when in the locked position. In further embodiments, enclosure assembly 400 may include any number of engagement brackets similar to engagement bracket 446 that are engaged with any one of prong latches 454-460. For example, and without limitation, in some embodiments, enclosure assembly 400 does not include bore frame 448 and instead includes four engagement brackets, each corresponding to one of prong latches 454-460.

An actuator 462 is connected to latch blocks 450, 452 and may be turned or rotated, such as with a physical key (not shown), to extend and retract latch blocks 450, 452 into and out of engagement with engagement bracket 446 and bore frame 448. As shown in FIG. 8, first latch block 450 and second latch block 452 are each in a locked position. To unlock lock assembly 442 when opening door panel 428 (shown in FIG. 4B), actuator 462 is rotated, which actuates a cam connector (not shown), moving first latch block 450 in the direction A and out of engagement with bore frame 448. Rotation of actuator 462 further moves second latch block 452 in the direction B, substantially opposite direction A, and out of engagement with engagement bracket 446.

In the example embodiment, bore frame 448 is slidable and/translatable in the directions, “C” and “D,” such that bore frame 448 can be translated vertically relative to a side portion 464 of BNA 124. As a result, in at least one implementation, bore frame 448 may be translated in the direction “C” to permit removal of BNA 124 from enclosure assembly 400. Likewise, to retain BNA 124 within enclosure assembly 400, bore frame 448 may be translated in the direction “D,” which causes bore frame 448 to physically impede removal of BNA 124 from enclosure assembly 400. A fastener 466 can be adjusted to permit translation of bore frame 448 as desired.

Figure 9:
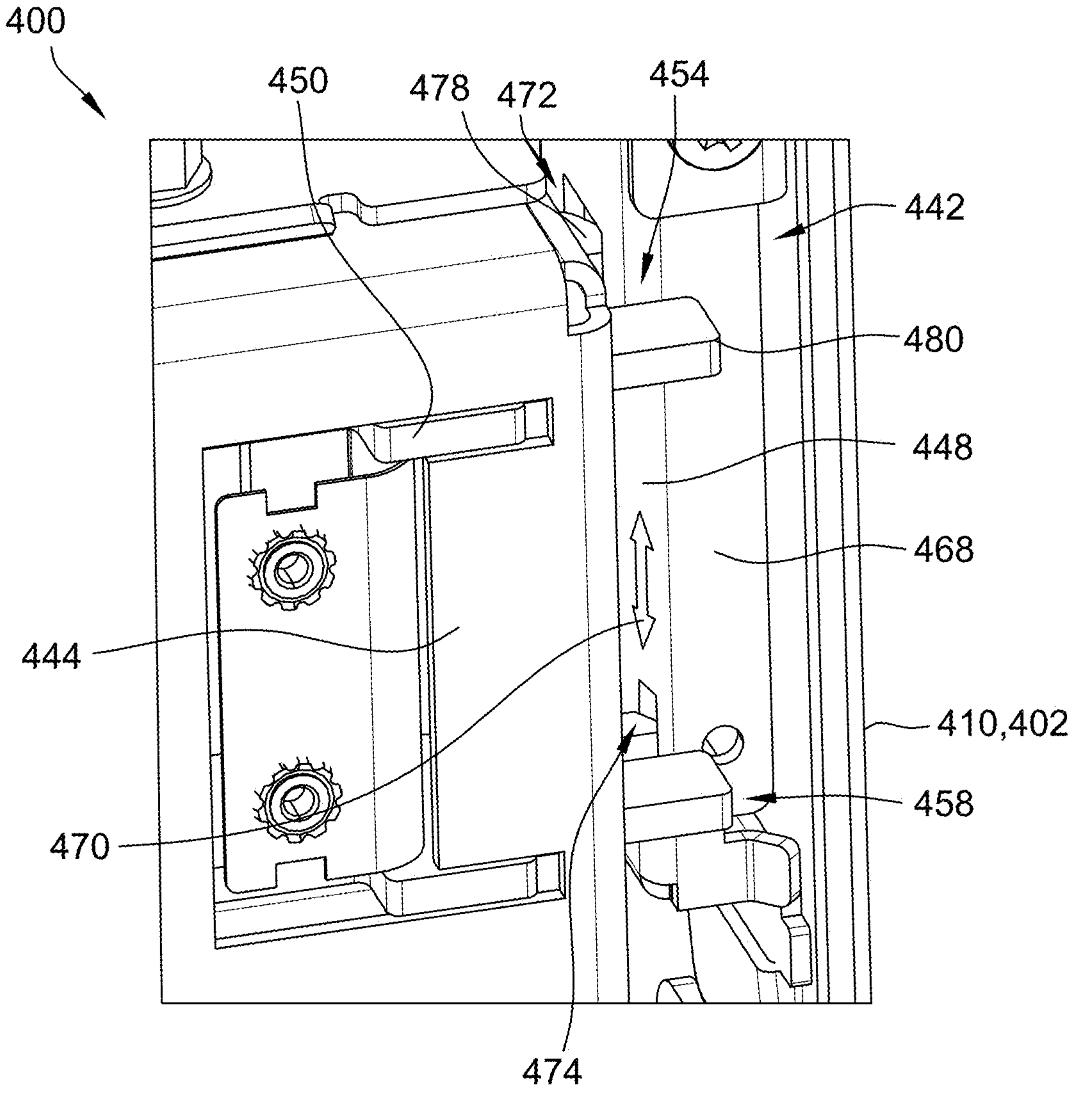
FIG. 9 is a perspective view of a first side of the lock assembly shown in FIG. 8.

FIG. 9 is a perspective view of a portion of enclosure assembly showing first latch block 450 engaged with bore frame 448. In the example embodiment, bore frame 448 includes a pair of side walls 468 (one shown in FIG. 9) extending inward from first side wall 410 of housing 402 and an end wall 470 extending between side walls 468. End wall 470 defines an upper opening 472 and a lower opening 474. Upper and lower prong latches 454, 458 of first latch block 450 each include a first prong 478 extending into a respective one of the openings 472, 474, and a second prong 480 that contacts bore frame side wall 468. Accordingly, when first prongs 478 are received in openings 472, 474 of bore frame 448 lateral movement of door panel 428 (shown in FIG. 4B) relative to first side wall 410 is restricted.

Figure 10:
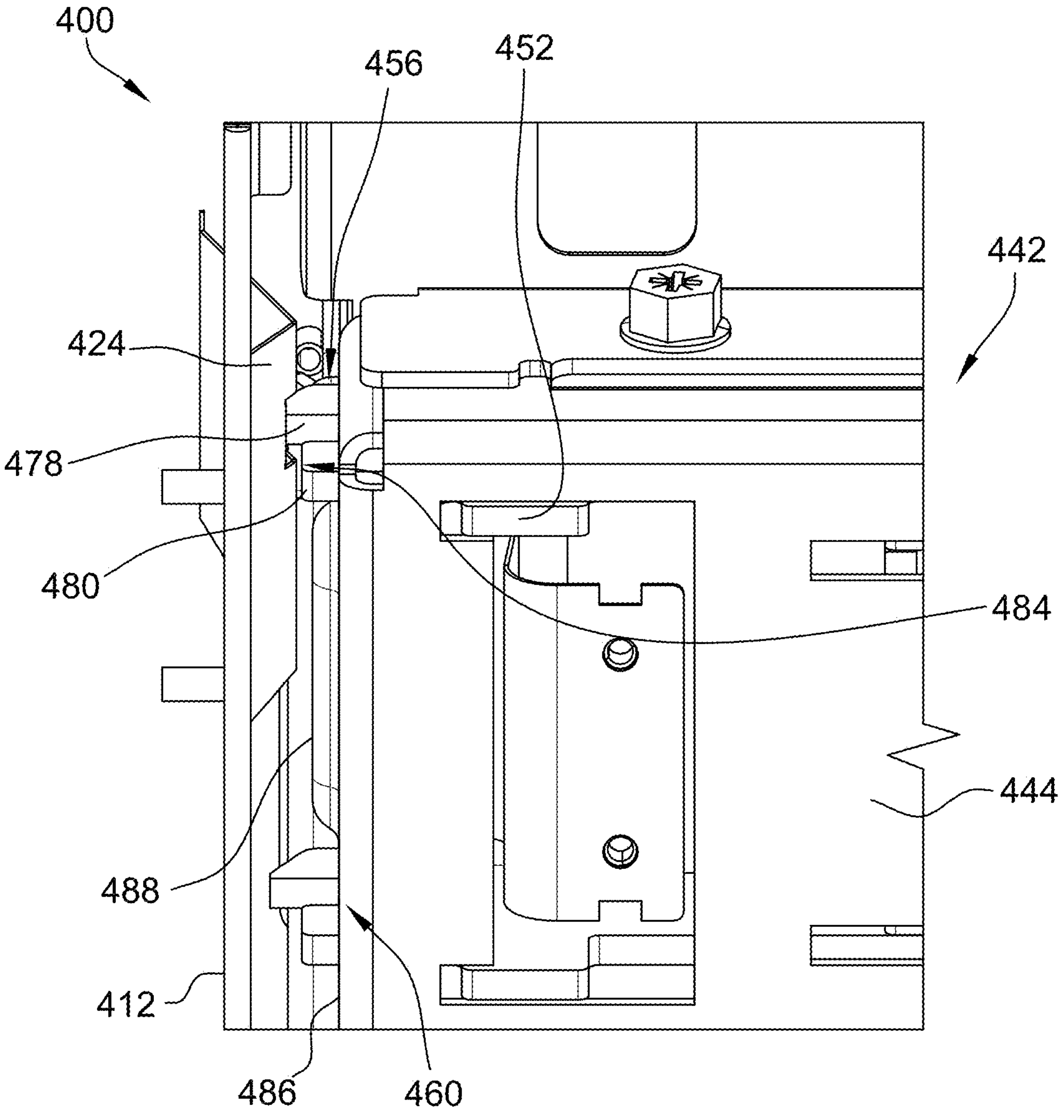
FIG. 10 is a perspective view of a second side of the lock assembly shown in FIG. 8.
Figure 11:
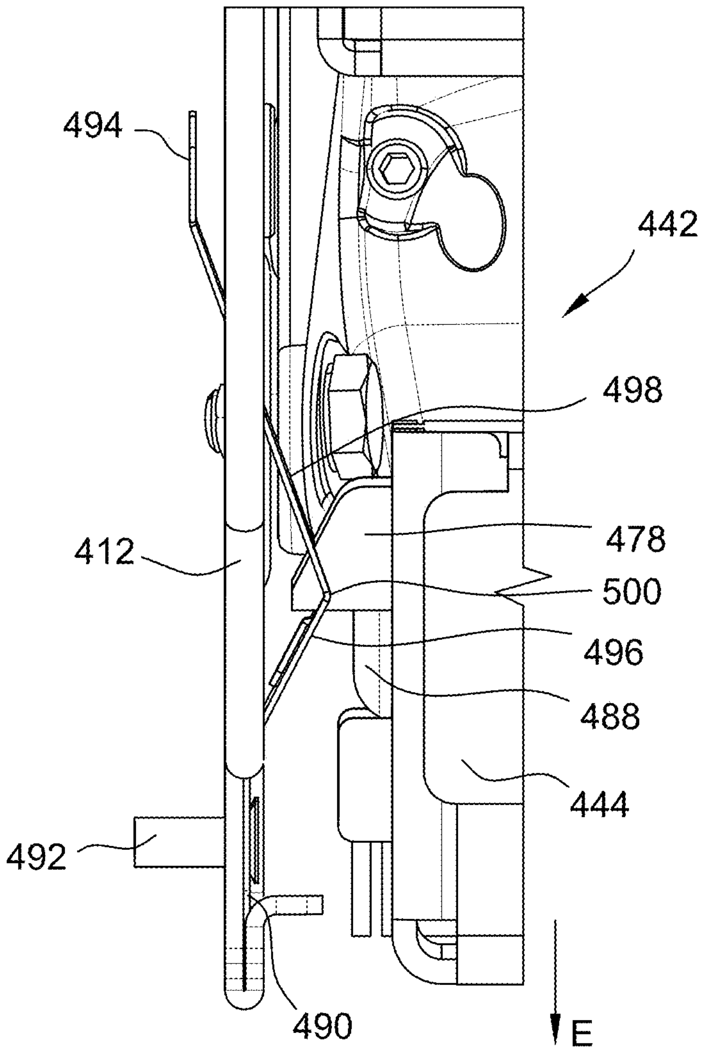
FIG. 11 is a top view of the second side of the lock assembly shown in FIG. 10.

FIG. 10 is a perspective view of another portion of enclosure assembly 400 showing second latch block 452 engaged with engagement bracket 424. FIG. 11 is a top view of the portion of enclosure assembly 400 shown in FIG. 9.

Referring to FIG. 9, second latch block 452 is substantially the same as first latch block 450, in that upper prong latch 456 and lower prong latch 460 each include a pair of first and second prongs 478, 480. Engagement bracket 424 is attached to second side wall 412 and extends through an opening 482 (shown in FIG. 12) defined in second side wall 412. First prong 478 of upper prong latch 456 extends into a notch or slot 484 defined in engagement bracket 424. Lock frame 444 includes a side surface 486 facing second side wall 412 and a projection 488 that extends outward from side surface 486 toward second side wall 412.

Referring to FIG. 10, engagement bracket 424 is spaced from and out of contact with projection 488 of lock frame 444. Engagement bracket 424 is configured to flex in respond to a force exerted on engagement bracket 424 to contact projection 488 and resist opening of door panel 428 or more specifically, resist movement of lock assembly 442 relative to second side wall 412.

In the example embodiment, engagement bracket 424 extends between a first end 490 attached to second side wall 412 by a fastener 492, to a second free distal end 494. Engagement bracket 424 includes a first surface 496 extending from first end 490 and a second surface 498 that extends from first surface 496 to second end 494. First surface 496 and second surface 498 have an offset orientation from one another, and are specifically obliquely oriented to one another as shown in FIG. 11. A bend point 500 of engagement bracket 424 is defined at the intersection of first surface 496 and second surface 498. Notch 484 (shown in FIG. 9) is defined within first surface 496 and second surface 498, though in other embodiments, notch 484 may defined at any position along engagement bracket 424.

As shown in FIG. 11, during normal operations, engagement bracket 424 is out of contact with projection. In at least some embodiments, if enclosure assembly 400 is tampered with, such as by a person attempting to break into enclosure assembly 400, any outward or other "pulling" force exerted on door assembly 404 (i.e., in the direction E) will tend to drive bend point 500 and/or first and second surfaces 496, 498 of engagement bracket 424 into frictional engagement with projection, which may in turn, increase the structural rigidity and/or strength of enclosure 400, as door assembly 404 is wedged or driven into tighter contact with enclosure 400. Specifically, with first prong 478 extended through notch 484, movement of first prong 478 in the direction E causes engagement bracket to bend at bend point 500, moving first surface 496 and second surface 498 inward of second side wall 412 and into contact with projection 488 of lock frame 444. Accordingly, attempts to tamper with enclosure assembly 400 may in fact result in structural reinforcement of enclosure assembly 400 rather than any weakening of assembly 400.

Figure 12:
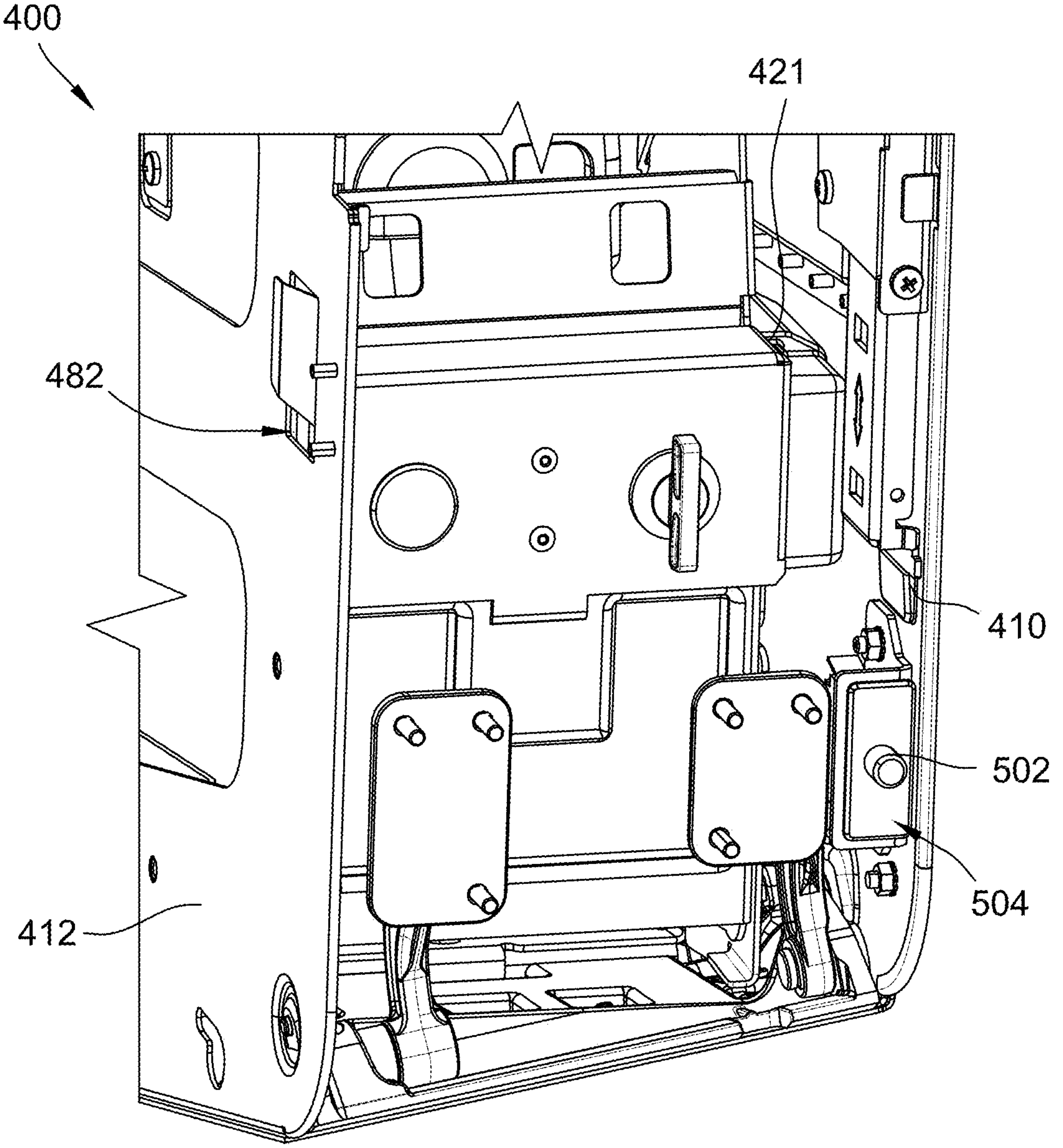
FIG. 12 is another perspective view of a portion of the enclosure assembly shown in FIG. 4A, with the door panel removed.
Figure 13:
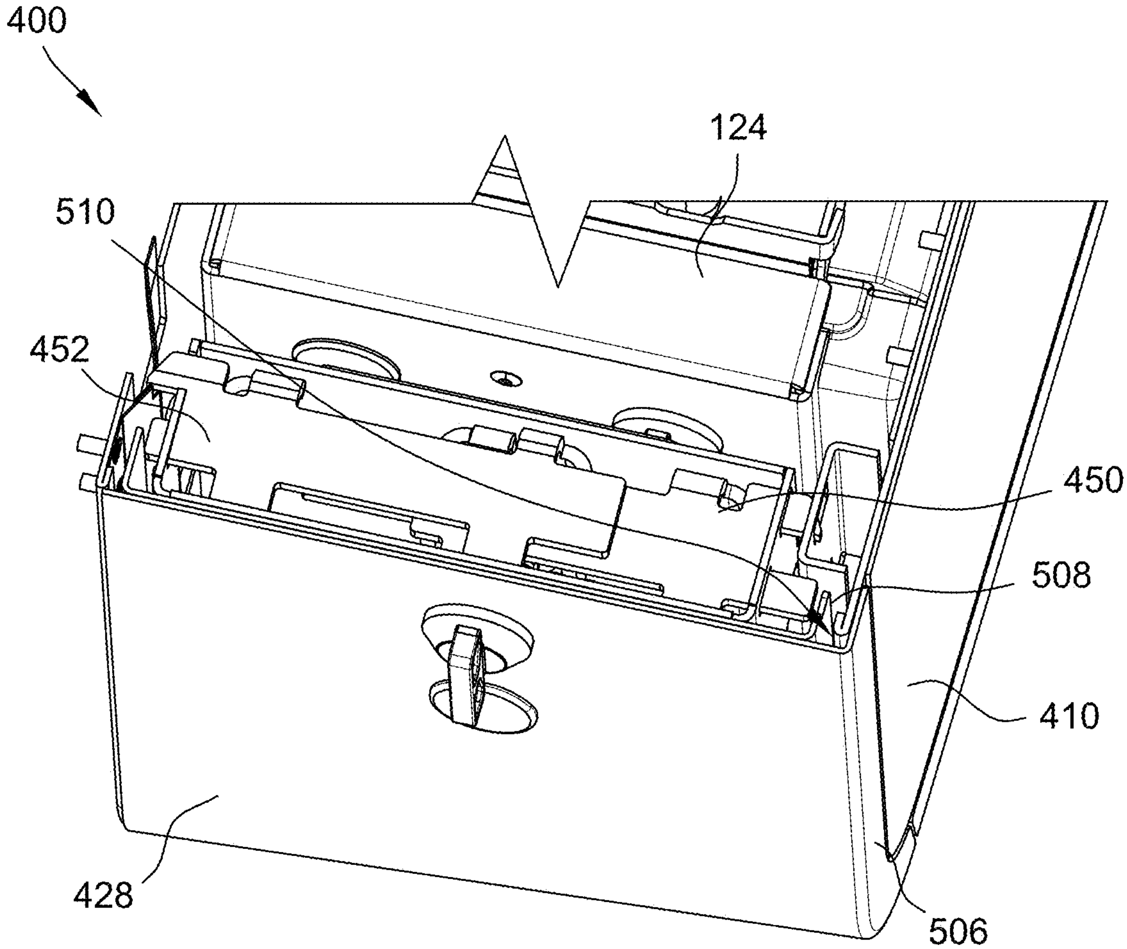
FIG. 13 is another perspective view of the enclosure assembly shown in FIG. 4A.

FIG. 12 is a side perspective view of enclosure assembly 400, with portions of door assembly 404 and lock assembly 442 removed to reveal a switch 502. FIG. 13 is a top perspective view of enclosure assembly 400, illustrating first and second latch blocks 450, 452.

Referring to FIG. 12, in the example embodiment enclosure assembly 400 further includes a switch 502 coupled to first side wall 410. Switch 502 is configured to detect whether door panel 428 is in the open or closed positions. Switch 502 includes a compressible push button 504 that is compressed when door panel 428 is in the closed position and extended when door panel 428 is in the open position. Switch 502 is coupled in communication a controller, EGM game controller 202 shown in FIG. 2A, within cabinet 401 (shown in FIG. 4A). In some embodiments, when switch 502 detects that door panel 428 is open, an alarm or alert may be triggered on EGM 104 or transmitted to a central server for notifying a technician.

Referring to FIG. 13, door panel 428 further includes at least one end flange 506 that extends around at least a portion of one of the side walls 410, 412 of housing 402. Specifically, in the example embodiment, first side wall 410 includes a hook wall 508 that extends inward of end flange 506 of door panel 428. As a result, hook wall 508 and end flange 506 define a winding gap 510 between door assembly 404 and first side wall 410, obstructing linear insertion of any tampering devices, such as a lock pick, through the winding gap 510.

Figure 14:
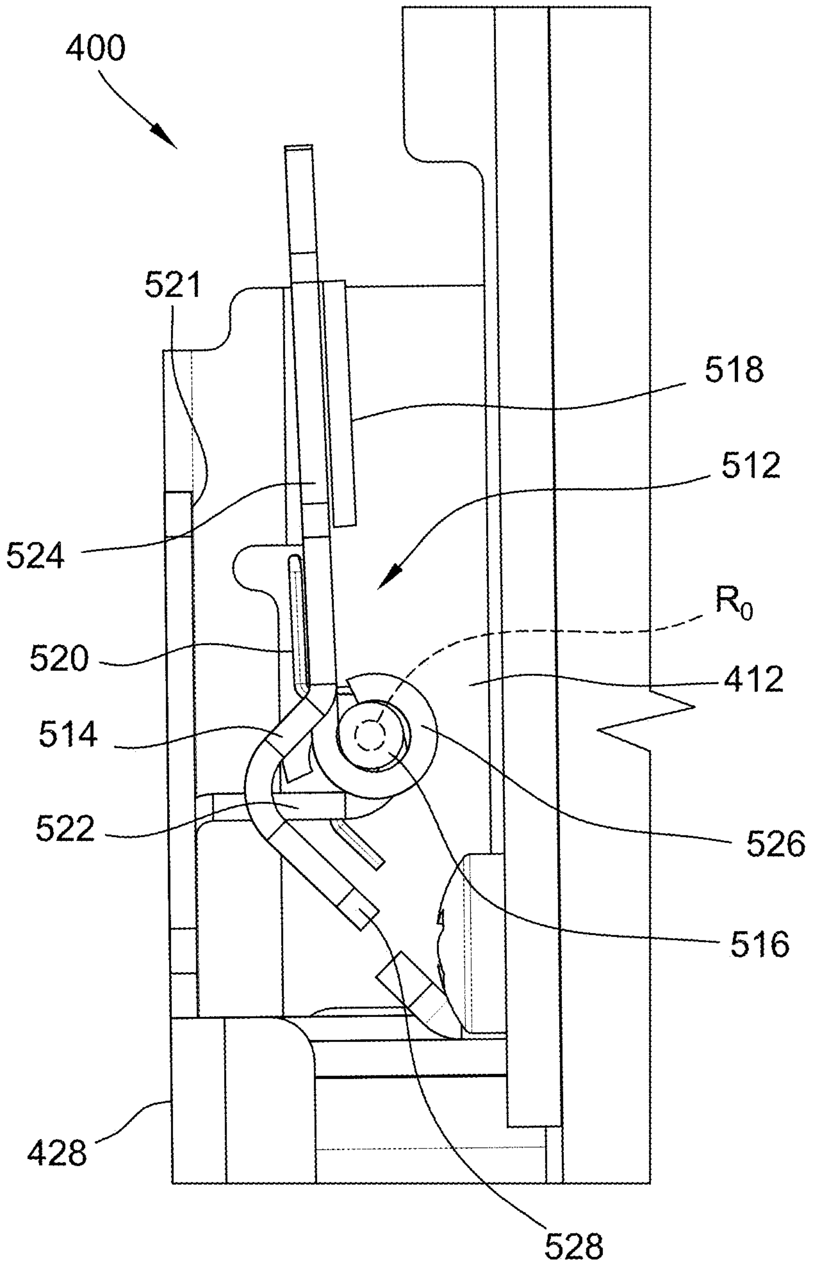
FIG. 14 is a side view of a portion of the enclosure assembly shown in FIG. 4A, showing the door panel in a closed position and a gap closing assembly in a raised position.
Figure 15:
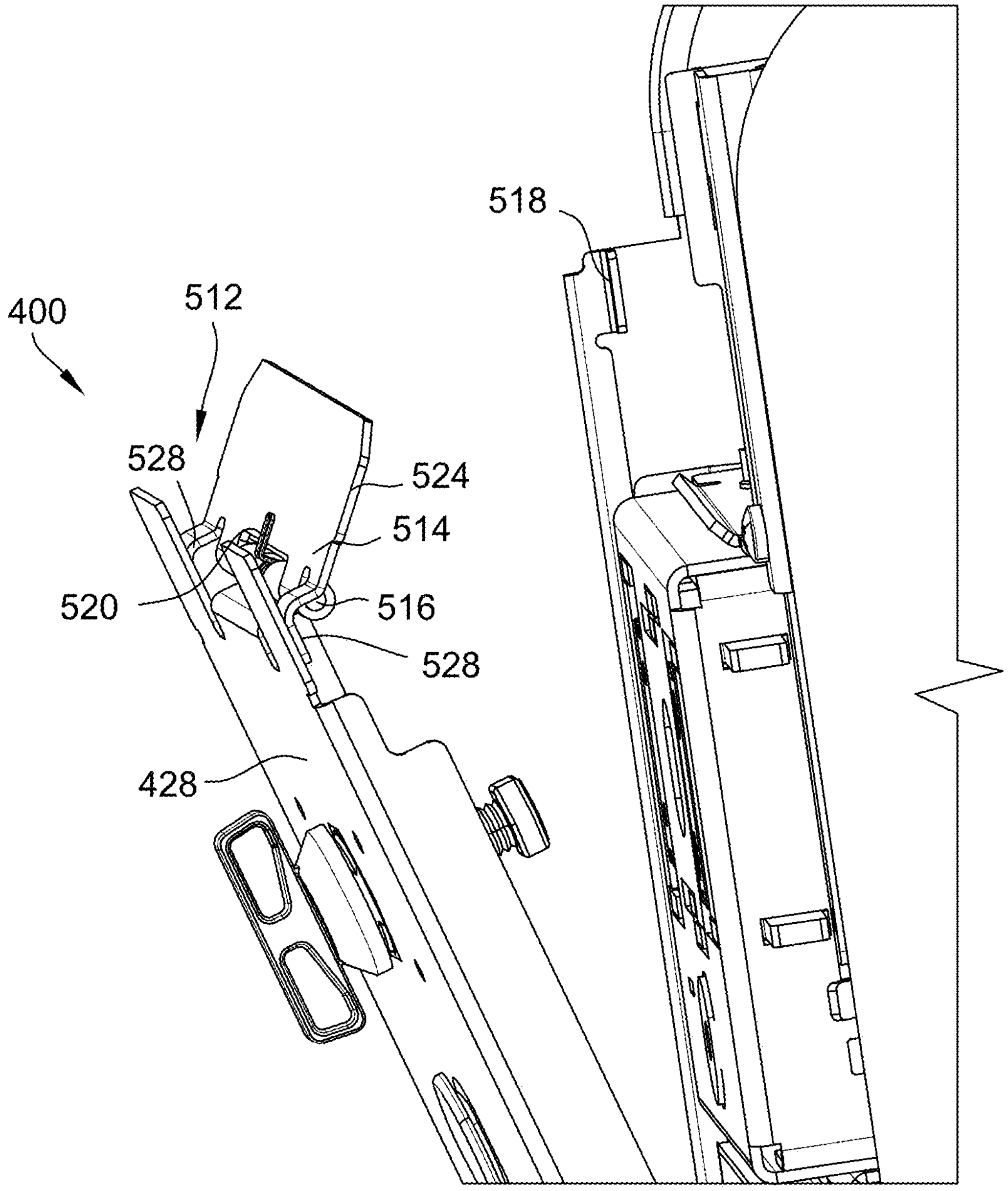
FIG. 15 is a perspective view of the portion of the enclosure assembly shown in FIG. 14, showing the door panel in a partially opened position and the gap closing assembly in a lowered position.

FIGS. 14 and 15 show a gap closing assembly 512 of enclosure assembly 400. Specifically, FIG. 14 shows gap closing assembly 512 in a raised position when door panel 428 is closed and FIG. 15 shows gap closing assembly 512 in a lowered position when door panel 428.

Gap closing assembly 512 is configured to extend across gap 413 (shown in FIG. 4A) in the raised position when door panel 428 is closed to obstruct any intrusions into enclosure assembly through gap 413. Additionally, gap closing assembly 512 is at least partially moveable relative to door panel 428 such that door panel 428 may be opened without obstruction between gap closing assembly 512 and BNA cover 411 (shown in FIG. 4A). Specifically, when gap closing assembly 512 is in the raised position, as shown in FIG. 14, a rotatable cover 514 extends vertically across gap 413 and at least partially within an interior of BNA cover 411 (shown in FIG. 4A) to close off gap 413. When door panel 428 is opened, rotatable cover 514 of gap closing assembly 512 is passively rotated to the lowered position (shown in FIG. 15) to clear BNA cover 411 and allow for opening of door panel 428.

Referring to FIG. 14, gap closing assembly 512 includes a shaft 516, rotatable cover 514, a back stop 518, and a biasing element 520. Shaft 516 is attached to door panel 428 and is supported on door panel 428 by an arm 522, extending inward from an interior surface 521 of door panel 428. Shaft 516 is positioned within arm 522 and is rotatable relative thereto about a rotational axis $R_1$. In other embodiments, shaft 516 does not rotate and rotatable cover 514 may be rotatably mounted on shaft 516.

Rotatable cover 514 includes a flap portion 524, a ring portion 526, and a pair of stop feet 528. Ring portion 526 wraps around shaft 516 to attach rotatable cover 514 to shaft 516. Flap portion 524 extends radially outward from ring portion 526. Stop feet 528 extend in a generally opposite direction from ring portion 526 as flap portion 524. In the example embodiment, rotatable cover includes two stop feet 528 (shown in FIG. 15), though any suitable number of stop feet 528 may be included.

Biasing element 520 is attached to shaft 516 and engages flap portion 524 to bias flap portion 524 inward of door panel 428 (i.e., in a clockwise direction on shaft 516 as shown in FIG. 2. In the example embodiment, biasing element 520 is a torsion spring, though other suitable biasing elements may also be used. A back stop 518 is attached to second side wall 412 and extends inward from second side wall 412 to contact flap portion 524 when door panel 428 is in the closed position. A substantially identical back stop is also attached to first side wall 410 of enclosure assembly. Back stops 518 hold flap portion 524 in the raised position against a biasing force of biasing element 520.

As door panel 428 is opened, shaft 516 and rotatable cover 514 are carried with door panel 428 away from back stops 518 and biasing element 520 biases rotatable cover 514 to rotate with shaft 516 to the lowered position, as shown in FIG. 15. In the example embodiment, flap portion 524 rotates approximately 60 degrees between the raised position and lowered position. In the lowered position, flap portion 524 does not overlap BNA cover 411 and door panel 428 may be fully opened without obstruction.

Referring to FIG. 15, in the lowered position, stop feet 528 each contact at least a portion of door panel 428, providing a stop against further rotation of rotatable cover 514. When door panel 428 is raised to again close door panel 428, flap portion 524 will clear BNA cover 411 (FIG. 4A) and contact back stop 518. Engagement of flap portion 524 with back stop 518 overcomes biasing force provided by biasing element 520 on flap portion 524 and causes flap portion to rotate outwards (i.e., counter-clockwise in FIG. 15) to the raised position, as shown in FIG. 14.

Exemplary technical effects of the methods, systems, and apparatus described herein include at least one of: (a) providing a secure locking of a BNA within an enclosure of an electronic gaming machine; (b) reduced size of a lock assembly of a BNA enclosure, as compared with at least some systems that use multiple bore frames mounted to an enclosure; (c) reduced overall damage to door panels by damping a portion of the angular motion of the door panel when opened; (d) reduced complexity in servicing, installation, and/or removal of BNA from an enclosure assembly; (e) reduced overall time required in servicing, installation, and/or removal of a BNA from an enclosure assembly; (f) improved tamper prevention, at least in part due to the mechanical strength of the enclosure assembly provided by engagement between the engagement bracket and the projection; (g) reduced accessible openings between enclosure assembly interior due at least in part, to the moveable gap cover assembly.

While the disclosure has been described with respect to the figures, it will be appreciated that many modifications and changes may be made by those skilled in the art without departing from the spirit of the disclosure. Any variation and derivation from the above description and figures are included in the scope of the present disclosure as defined by the claims.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An enclosure assembly for securely housing a bank notes acceptor (BNA) for use with an electronic gaming machine (EGM), the enclosure assembly comprising:
- a housing comprising a side wall at least partially defining an interior sized and shaped to receive the BNA, the housing further comprising an engagement bracket coupled to the housing;
- a door panel movably coupled to the housing;
- a latch coupled to the door panel and positioned to engage the engagement bracket and lock the door panel closed on the housing; and
- a projection coupled to the door panel, wherein the latch causes the engagement bracket to flex into contact with the projection in response to the door panel being pulled outward when the door panel is locked to the housing.

2. The enclosure assembly of claim 1, wherein the engagement bracket defines a notch and wherein the latch extends into the notch when the door panel is locked to the housing.

3. The enclosure assembly of claim 1, wherein the engagement bracket further comprises a first surface extending from a first end of the engagement bracket and a second surface extending between the first surface and a second end of the engagement bracket, the second surface being obliquely oriented relative to the first surface.

4. The enclosure assembly of claim 3, wherein the engagement bracket defines a bend point between the first surface and the second surface, and wherein, when the door panel is locked to the housing, the bend point contacts the projection in response to the door panel being pulled outward.

5. The enclosure assembly of claim 1 further comprising:
- a bore frame coupled to the housing and defining an opening therein; and
- an additional latch coupled to the door panel and extending into the opening of the bore frame, when the door panel is locked to the housing.

6. The enclosure assembly of claim 1 further comprising a torque damper configured to dampen at least a portion of an angular motion of the door panel relative to the housing, when the door panel is opened.

7. The enclosure assembly of claim 6, wherein the torque damper does not provide a dampening force to the door panel through approximately a first two thirds of the angular motion of the door panel when being opened, the torque damper providing a dampening force to the door panel in approximately the last one-third of angular motion.

8. The enclosure assembly of claim 6, wherein the torque damper is a hydraulic damper.

9. The enclosure assembly of claim 1 further comprising a switch coupled to the housing and coupled in communication with a controller of the EGM, the switch configured to detect whether the door panel is closed.

10. The enclosure assembly of claim 1 further comprising a gap closing assembly for at least partially covering a gap defined between the housing and the EGM, the gap closing assembly comprising:
- a shaft rotatably coupled to the door panel;
- a rotatable cover coupled to the shaft, the rotatable cover being rotatable between a raised position in which the cover extends into the gap, and a lowered position; and
- a biasing element coupled to the shaft and biasing the rotatable cover to the lowered position.

11. The enclosure assembly of claim 10, wherein the rotatable cover obstructs opening of the door panel in the raised position and does not obstruct opening of the door panel when in the lowered position.

12. The enclosure assembly of claim 10, wherein the housing further includes a back stop that, when the door panel is closed, holds the rotatable cover in the raised position.

13. The enclosure assembly of claim 12, wherein, when the door panel is closed, the biasing element contacts a first side of the rotatable cover and the back stop contacts a second side of the rotatable cover.

14. An electronic gaming machine (EGM) comprising:
- a cabinet;
- a display coupled to the cabinet for displaying an electronic game thereon; and an enclosure assembly for securely housing a bank notes acceptor (BNA) therein, the enclosure assembly comprising:
a housing comprising a side wall at least partially defining an interior sized and shaped to receive the BNA, the housing further comprising an engagement bracket coupled to the housing;
a door movably coupled to the housing;
a latch coupled to the door and positioned to engage the engagement bracket and lock the door closed on the housing; and
a projection coupled to the door, wherein the engagement bracket is configured to flex into contact with the projection in response to an outward force on the door when the door is locked to the housing.

15. The electronic gaming machine of claim 14, wherein the engagement bracket defines a notch and wherein the latch extends into the notch when the door is locked to the housing.

16. The electronic gaming machine of claim 14, wherein the engagement bracket further comprises a first surface extending from a first end of the engagement bracket and a second surface extending between the first surface and a second end of the engagement bracket, the second surface being obliquely oriented relative to the first surface, the engagement bracket defining a bend point between the first surface and the second surface, and wherein, when the door is locked to the housing, the bend point contacts the projection in response to the door being pulled outward.

17. The electronic gaming machine of claim 14 further comprising a gap closing assembly for at least partially covering a gap defined between the housing and the cabinet, the gap closing assembly comprising:
a shaft rotatably coupled to the door;
a rotatable cover coupled to the shaft, the rotatable cover being rotatable between a raised position in which the cover extends into the gap, and a lowered position; and
a biasing element coupled to the shaft and biasing the rotatable cover to the lowered position.

18. The electronic gaming machine of claim 17, wherein the rotatable cover obstructs opening of the door in the raised position and does not obstruct opening of the door when in the lowered position.

19. The electronic gaming machine of claim 17, wherein the housing further includes a back stop that, when the door is closed, holds the rotatable cover in the raised position, wherein, when the door is closed, the biasing element contacts a first side of the rotatable cover and the back stop contacts a second side of the rotatable cover.

20. A method of securing a bank notes acceptor (BNA) within an enclosure assembly of an electronic gaming machine, the method comprising:
providing a housing including a side wall at least partially defining an interior sized and shaped to receive the BNA, the housing further including an engagement bracket coupled to the housing;
moving a door from an open position to a closed position, the door being movably coupled to the housing; and
moving a latch into engagement with the engagement bracket to lock the door in the closed position, the latch being coupled to the door, wherein in response to an opening force being applied on the door when the door is locked in the closed position, the engagement bracket flexes into contact with a projection coupled to the door.

* * * * *